United States Patent
Tokairin et al.

(10) Patent No.: US 11,152,880 B2
(45) Date of Patent: Oct. 19, 2021

(54) CONTROL APPARATUS AND BRUSHLESS MOTOR

(71) Applicant: FUJIFILM BUSINESS INNOVATION CORP., Tokyo (JP)

(72) Inventors: Motohiro Tokairin, Kanagawa (JP); Yukitoshi Takano, Kanagawa (JP); Yukio Kontani, Kanagawa (JP); Toyohiko Hoshino, Kanagawa (JP); Hitoshi Mikami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 20 days.

(21) Appl. No.: 16/837,079

(22) Filed: Apr. 1, 2020

(65) Prior Publication Data

US 2021/0091695 A1     Mar. 25, 2021

(30) Foreign Application Priority Data

Sep. 25, 2019   (JP) .............................. JP2019-173662

(51) Int. Cl.
*H02P 21/22*     (2016.01)
*H02M 7/5387*    (2007.01)
(Continued)

(52) U.S. Cl.
CPC .............. *H02P 21/22* (2016.02); *H02M 1/38* (2013.01); *H02M 7/53871* (2013.01); *H02P 27/08* (2013.01)

(58) Field of Classification Search
CPC ...... H02P 1/00; H02P 1/04; H02P 1/16; H02P 1/163; H02P 1/18; H02P 1/22; H02P 1/24; H02P 1/26; H02P 1/265; H02P 1/28; H02P 1/42; H02P 1/46; H02P 1/465; H02P 3/00; H02P 3/025; H02P 3/06; H02P 3/065;
(Continued)

(56) References Cited

U.S. PATENT DOCUMENTS 10,494,017 B2 * 12/2019  Takase .................... H02P 27/08
10,608,572 B2 *  3/2020  Ue .......................... H02P 21/09
(Continued)

FOREIGN PATENT DOCUMENTS

EP     3522361 A1     8/2019
JP     2009-44822 A   2/2009
(Continued)

*Primary Examiner* — Antony M Paul
(74) *Attorney, Agent, or Firm* — Oliff PLC

(57) ABSTRACT

A control apparatus includes a controller that controls, by vector control, voltages and currents to be supplied to plural phases of a brushless motor. The vector control is performed through rotation control using a q-axis current predominantly to control rotation of a rotor, and field fixing control using a d-axis current predominantly in response to reception of a stop command signal. The controller controls the brushless motor with reduced influence of a dead time, in which a high-side switching element and a low-side switching element of each of plural half-bridge circuits are simultaneously set to OFF. The plural half-bridge circuits are provided in association with the plural phases of the brushless motor and are configured to supply the voltages and the currents to the respective phases. The influence of the dead time is reduced through the field fixing control.

14 Claims, 21 Drawing Sheets

(51) Int. Cl.
*H02P 27/08* (2006.01)
*H02M 1/38* (2007.01)

(58) Field of Classification Search
CPC ...... H02P 3/08; H02P 3/12; H02P 3/18; H02P 3/22; H02P 6/00; H02P 6/06; H02P 6/085; H02P 6/14; H02P 6/16; H02P 6/24; H02P 6/30; H02P 6/28; H02P 7/04; H02P 7/10; H02P 7/282; H02P 21/00; H02P 21/003; H02P 21/0021; H02P 21/04; H02P 21/06; H02P 21/08; H02P 21/18; H02P 21/22; H02P 21/32; H02P 23/00; H02P 27/00; H02P 27/04; H02P 27/06; H02P 27/08; H02M 7/53871; H02M 1/38
See application file for complete search history.

(56) References Cited

U.S. PATENT DOCUMENTS 10,676,127 B2 * 6/2020 Takase .................... B62D 6/00
2019/0241208 A1 8/2019 Takase et al.

FOREIGN PATENT DOCUMENTS

| JP | 2014-217113 A | 11/2014 |
| JP | 2017-22867 A | 1/2017 |
| JP | 2018-98915 A | 6/2018 |
| JP | 2018-153091 A | 9/2018 |
| JP | 2019-13134 A | 1/2019 |
| JP | 2019-13135 A | 1/2019 |

* cited by examiner

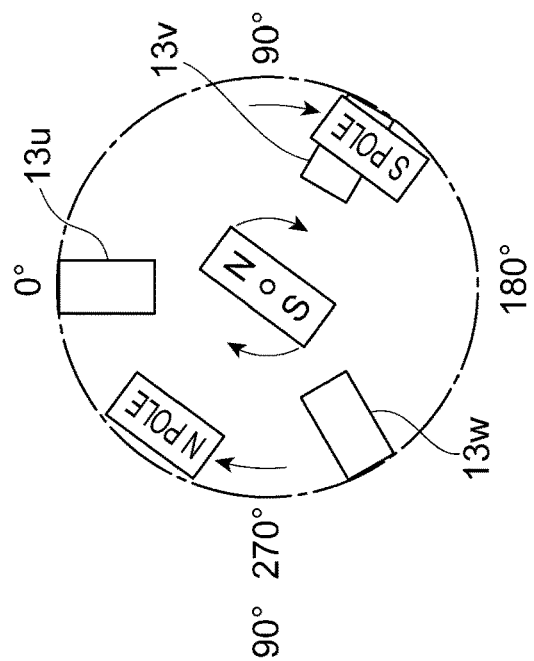
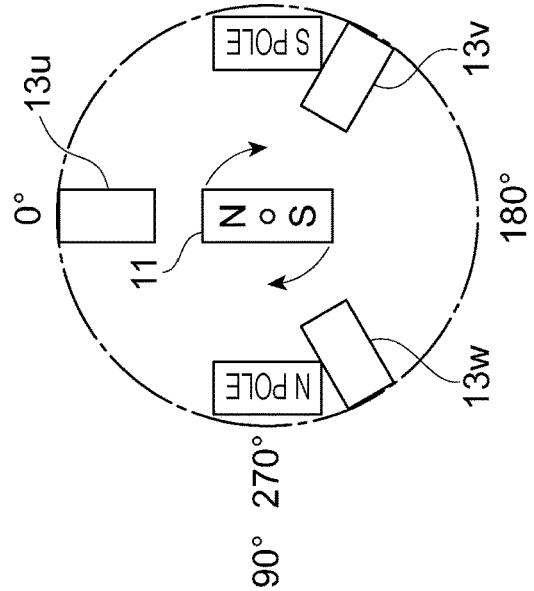
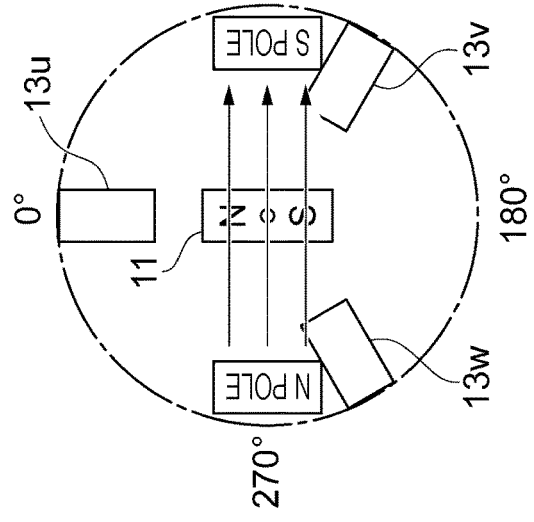

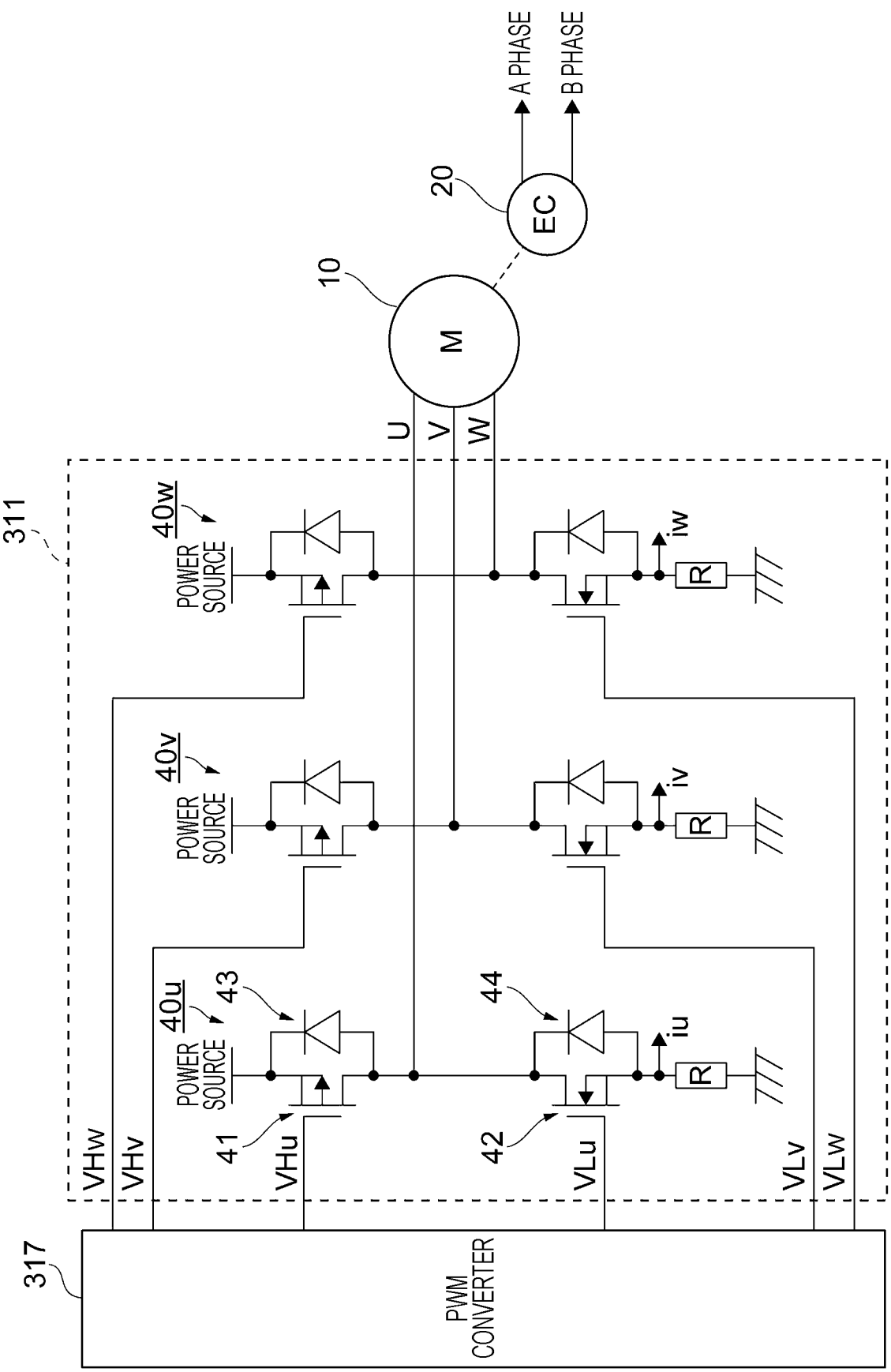

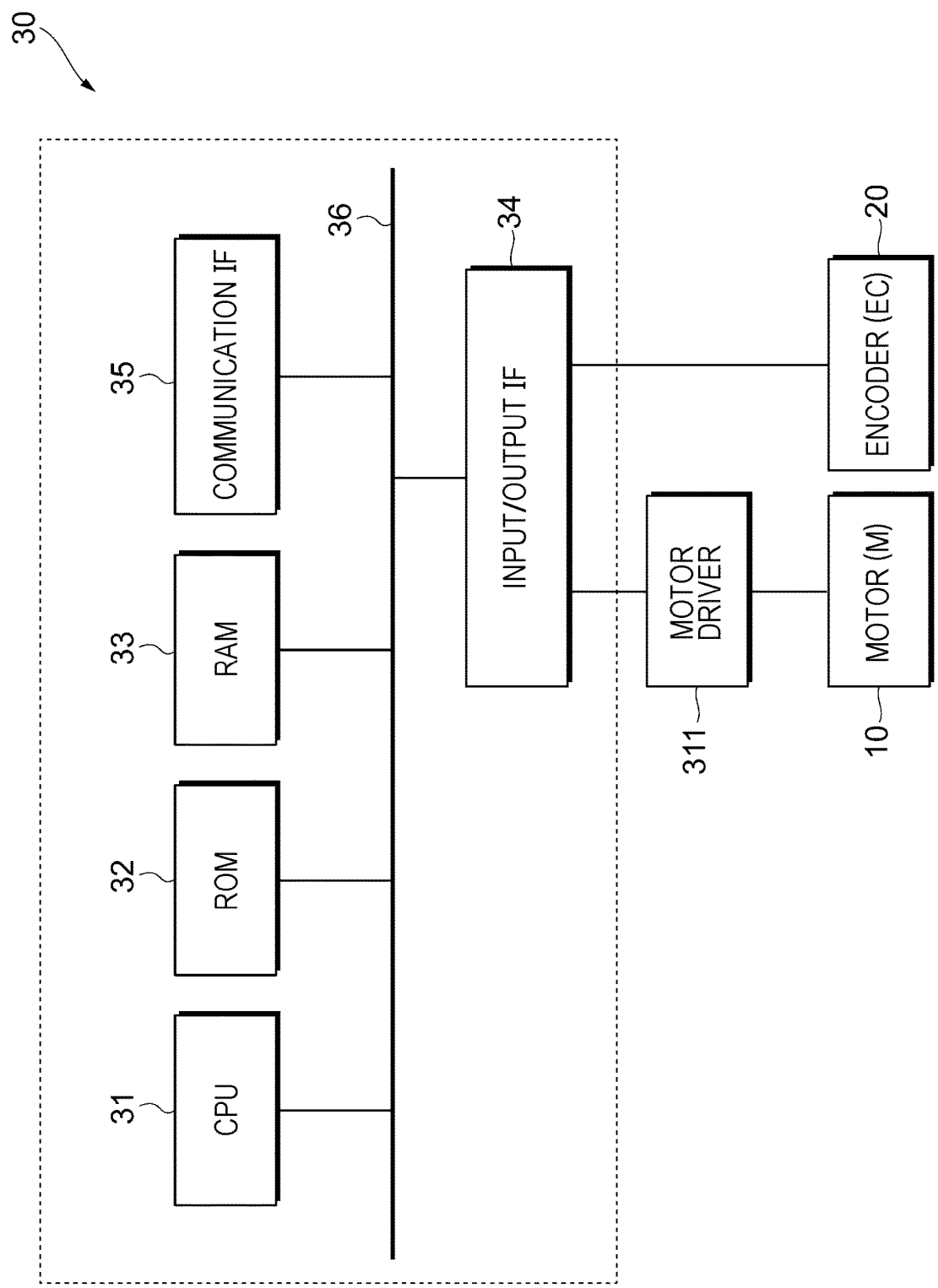

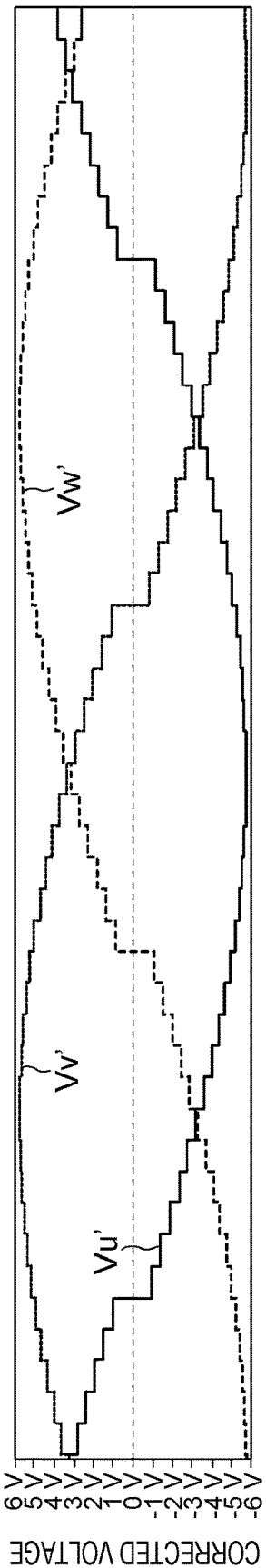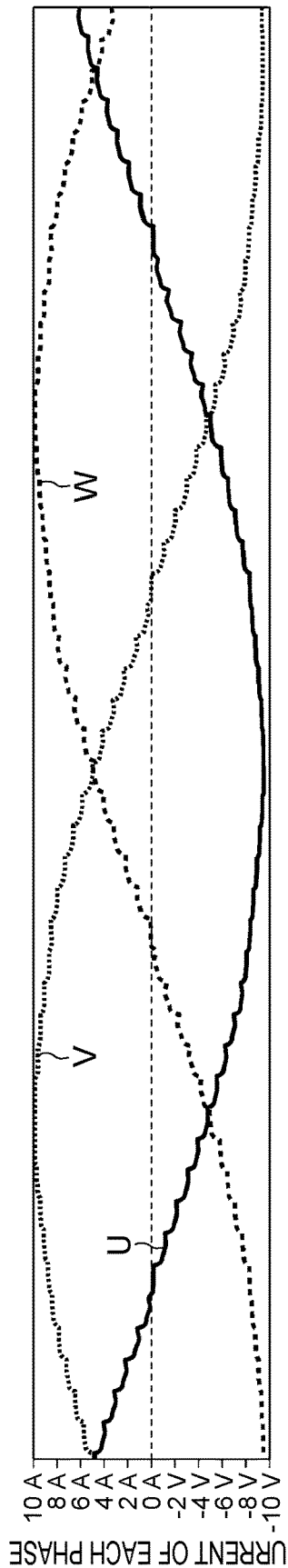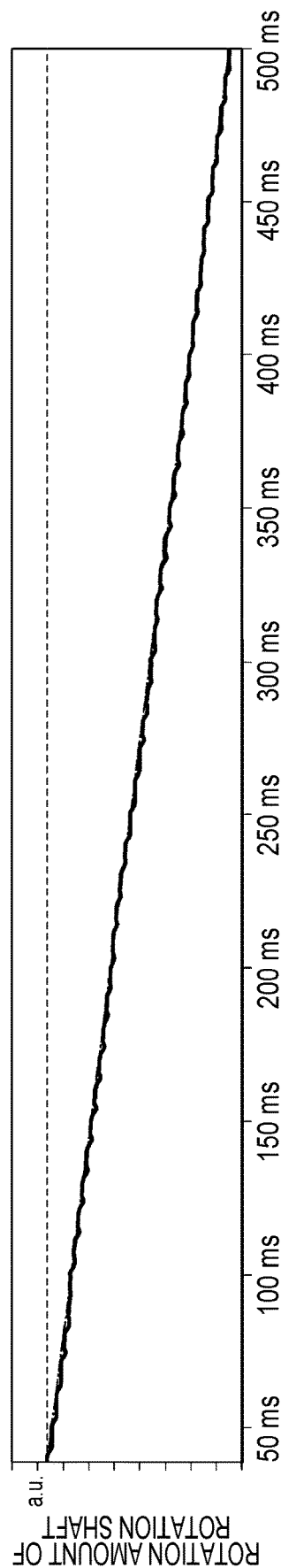

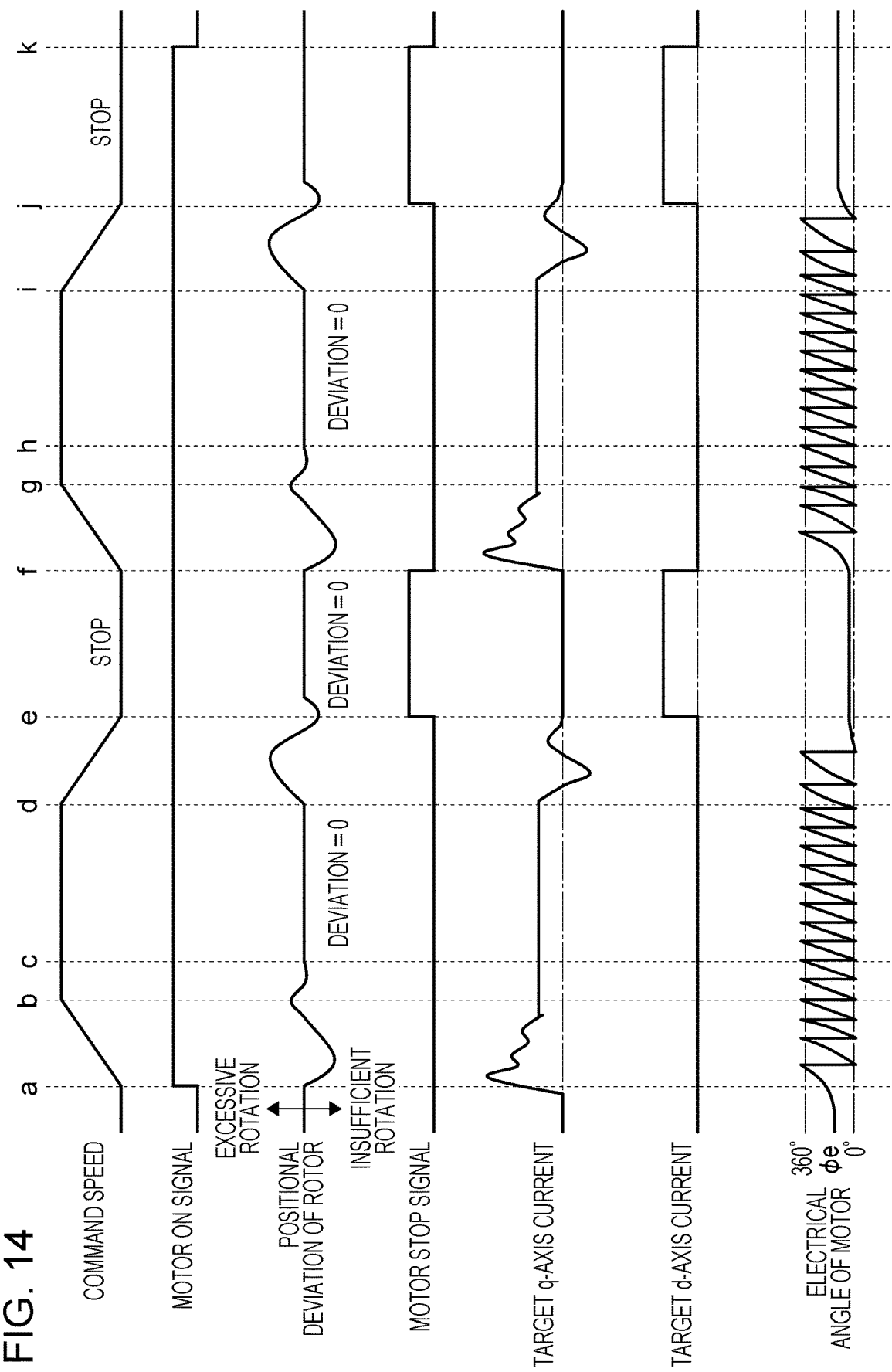

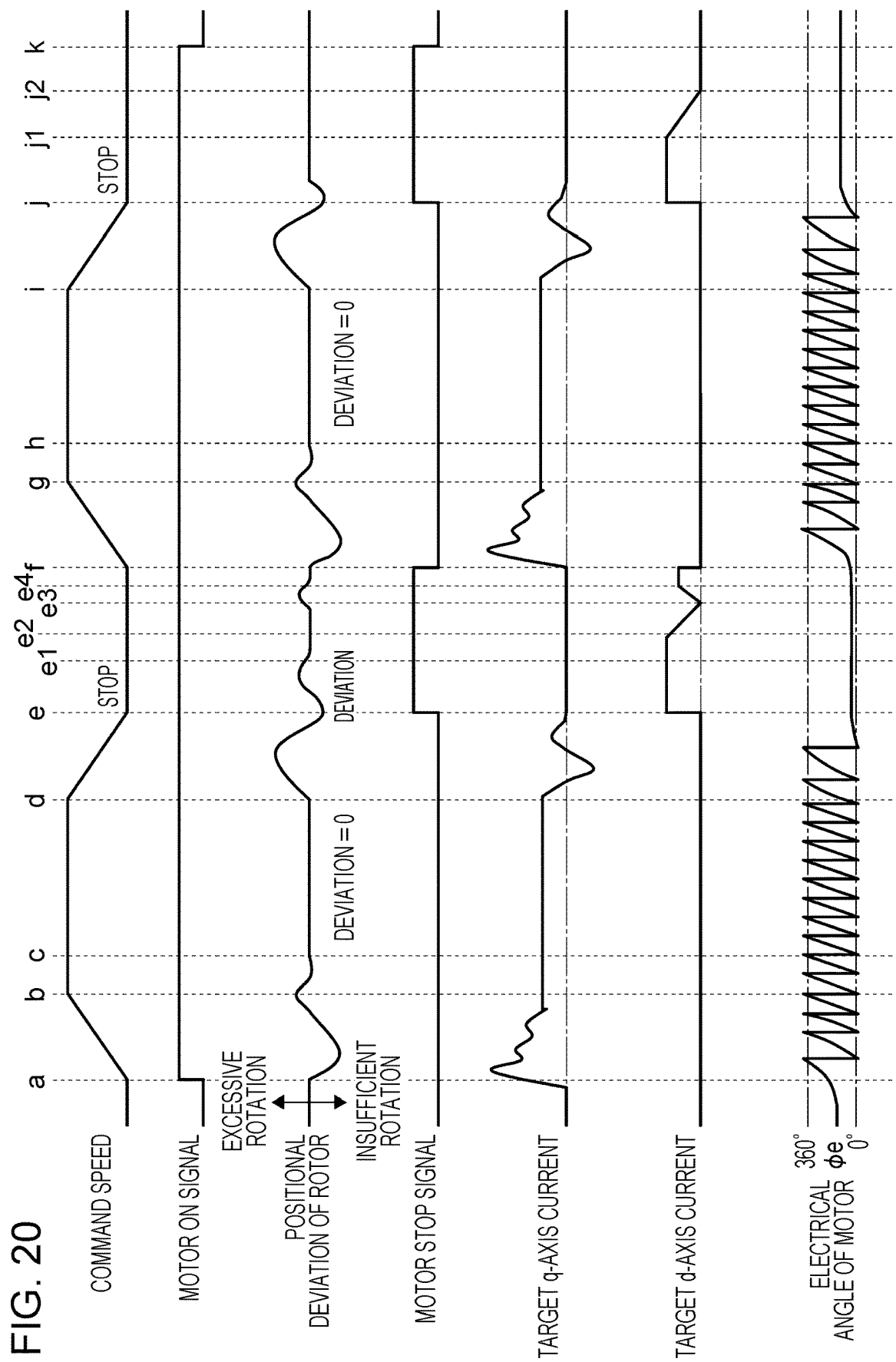

CONTROL APPARATUS AND BRUSHLESS MOTOR

CROSS-REFERENCE TO RELATED APPLICATIONS

This application is based on and claims priority under 35 USC 119 from Japanese Patent Application No. 2019-173662 filed Sep. 25, 2019.

BACKGROUND

(i) Technical Field

The present disclosure relates to a control apparatus and a brushless motor.

(ii) Related Art

Japanese Unexamined Patent Application Publication No. 2017-22867 describes a motor driving method including the following three steps. The first step is a setup energization step. A fixed magnetic field is generated by two-phase energization during a predetermined period before the start of a motor, and a rotor is positioned with a phase shift of 30° from a zero cross point. The second step is a single-phase 180° starting energization step. In a single-phase 60° bipolar rectangular wave energization pattern, energization is performed by selecting a section next to a theoretical setup stop position in an advancing direction. The third step is a single-phase 60° bipolar rectangular wave energization step. The starting energization is terminated by detecting a zero cross point advanced from the theoretical stop position of the rotor by a phase difference of 90°. Then, single-phase 60° bipolar rectangular wave energization is performed by detecting zero cross points at intervals corresponding to a phase difference of 60°.

Japanese Unexamined Patent Application Publication No. 2014-217113 describes a motor driving apparatus including an inverter and a controller. The inverter includes a plurality of switching elements and outputs driving electric power to a motor by turning ON or OFF the switching elements. When the motor is started, the controller performs PWM control for the switching elements so that predetermined exciting currents flow through windings in respective phases of the motor. Thus, a rotor of the motor is rotated to an initial position. The controller changes the initial position of the rotor every time the motor is started.

Japanese Unexamined Patent Application Publication No. 2018-98915 describes a magnet position deviation correcting method for an electric motor. A first measurement value and a second measurement value are obtained when an offset occurs in each energization pattern in positional detection for a permanent magnet. The first measurement value or the second measurement value is multiplied by a correction coefficient A to determine a corrected value in which the offset is corrected. The position of the permanent magnet is estimated based on the corrected value.

SUMMARY

Aspects of non-limiting embodiments of the present disclosure relate to the following circumstances. A control apparatus for a brushless motor controls voltages and currents to be supplied to the motor by controlling ON/OFF of a high-side switching element and a low-side switching element of each half-bridge circuit. At this time, deviations may occur in the voltages and the currents to be supplied to the brushless motor due to a dead time for preventing the occurrence of a case where the high-side switching element and the low-side switching element are simultaneously ON. Therefore, the brushless motor may have deviations in positional control, consume more currents, or have more fluctuations in speed.

It is desirable that the control apparatus control the brushless motor with reduced influence of the dead time.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control apparatus comprising a controller that controls, by vector control, voltages and currents to be supplied to a plurality of phases of a brushless motor. The vector control is performed through (1) rotation control using a q-axis current predominantly to control rotation of a rotor, and (2) field fixing control using a d-axis current predominantly in response to reception of a stop command signal. The controller controls the brushless motor with reduced influence of a dead time, in which a high-side switching element and a low-side switching element of each of a plurality of half-bridge circuits are simultaneously set to OFF. The plurality of half-bridge circuits are provided in association with the plurality of phases of the brushless motor and are configured to supply the voltages and the currents to the respective phases. The influence of the dead time is reduced through the field fixing control.

BRIEF DESCRIPTION OF THE DRAWINGS

Exemplary embodiments of the present disclosure will be described in detail based on the following figures, wherein:

FIGS. 4A to 4C illustrate rotation of a rotor of the motor, in which FIG. 4A illustrates a state in which currents flow at an electrical angle of 0° in FIG. 3, FIG. 4B illustrates a state in which the rotor starts to rotate, and FIG. 4C illustrates a state in which the rotor is rotating;

FIG. 5 illustrates a motor driver of a motor control apparatus, which applies voltages in the respective phases of the motor;

FIGS. 6A to 6C illustrate an example of relationships among target voltages set in the respective phases of the motor, currents flowing in the respective phases of the motor, and the rotation amount of a rotation shaft of the motor, in which FIG. 6A illustrates the target voltages set in the respective phases of the motor, FIG. 6B illustrates the currents flowing in the respective phases of the motor, and FIG. 6C illustrates the rotation amount of the rotation shaft of the motor;

FIG. 7 illustrates the hardware configuration of the motor control apparatus;

FIGS. 9A to 9C illustrate initial positional adjustment in the first exemplary embodiment, in which FIG. 9A illustrates the currents flowing in the respective phases of the motor, FIG. 9B illustrates a d-axis current, and FIG. 9C illustrates the position of the rotor;

FIGS. 10A to 10C illustrate initial positional adjustment in a third exemplary embodiment, in which FIG. 10A illustrates the currents flowing in the respective phases of the motor, FIG. 10B illustrates the d-axis current, and FIG. 10C illustrates the position of the rotor;

FIGS. 12A and 12B illustrate a waveform of a target voltage supplied by a coordinate converter and a waveform of a corrected voltage corrected by a dead time corrector, in which FIG. 12A illustrates the waveform of the target voltage supplied by the coordinate converter, and FIG. 12B illustrates the waveform of the corrected voltage corrected by the dead time corrector;

FIGS. 13A to 13C illustrate an example of relationships among the corrected voltages set in the respective phases of the motor, the currents flowing in the respective phases of the motor, and the rotation amount of the rotation shaft of the motor, in which FIG. 13A illustrates the corrected voltages set in the respective phases of the motor, FIG. 13B illustrates the currents flowing in the respective phases of the motor, and FIG. 13C illustrates the rotation amount of the rotation shaft of the motor;

FIG. 14 is a timing chart of rotational control for the motor to be performed by the motor control apparatus according to the fourth exemplary embodiment;

FIG. 20 is a timing chart of rotational control for the motor to be performed by the motor control apparatus according to the eighth exemplary embodiment.

DETAILED DESCRIPTION

Exemplary embodiments of the present disclosure are described below in detail with reference to the accompanying drawings.

A brushless motor includes a permanent magnet as a rotor, and a plurality of coils around the rotor as a stator. The rotor is rotated by a rotating magnetic field generated by changing currents flowing through the coils. The brushless motor may have the rotor around the stator. The brushless motor herein has the stator around the rotor.

First Exemplary Embodiment

Figure 1:
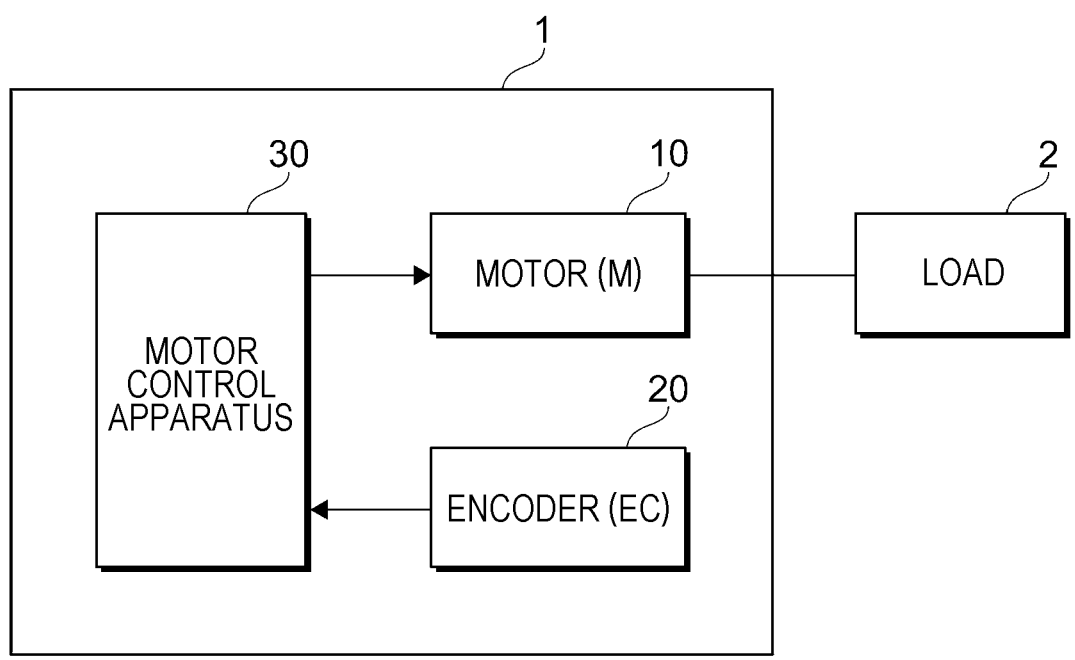
FIG. 1 illustrates an example of the overall configuration of a brushless motor according to a first exemplary embodiment.

FIG. 1 illustrates an example of the overall configuration of a brushless motor 1 according to a first exemplary embodiment.

The brushless motor 1 includes a motor 10, an encoder 20, and a motor control apparatus 30. The motor 10 includes a rotor, a stator, and a rotation shaft. The rotation shaft is fixed to the rotor and rotates together with the rotor. A load 2 is attached to the rotation shaft. The load 2 is a mechanical element such as a gear, a cam, or a roller and rotates together with the rotation shaft to transmit power. The encoder 20 outputs a rotation signal indicating a rotation direction and a rotation amount of the rotor.

For example, the encoder 20 is an optical transmissive encoder including a disc with slits, a light source, and a light receiving sensor. The slits of the disc are arranged at regular intervals along the circumference. In the encoder 20, light from the light source is received by the light receiving sensor through the slits of the disc. That is, the disc rotates together with the rotor and the light receiving sensor receives light passing through the slits of the disc as pulses. Two slit arrays (referred to as channels) of an A phase and a B phase are provided. An A-phase pulse or a B-phase pulse that rises first indicates the rotation direction. The number of pulses per unit time indicates the rotation amount. The rotation signal output from the encoder 20 to indicate the rotation direction and the rotation amount is an example of rotation information.

The motor control apparatus 30 is a computer that controls rotation of the motor 10 (specifically, rotation of the rotor) by using the rotation signal output from the encoder 20.

Figure 2:
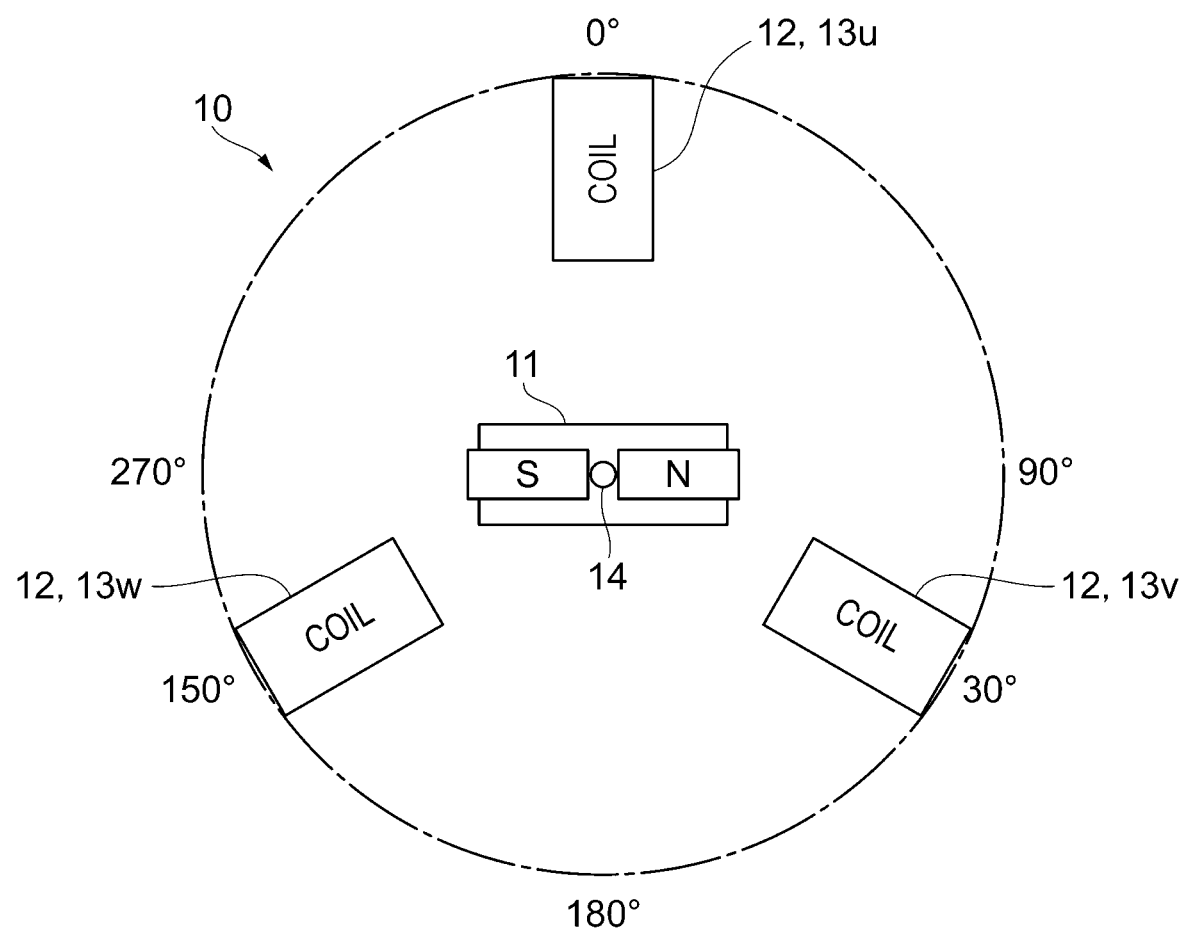
FIG. 2 illustrates an example of the structure of a motor.

FIG. 2 illustrates an example of the structure of the motor 10.

The motor 10 includes a rotor 11, a stator 12, and a rotation shaft 14. The rotation shaft 14 is fixed to the rotor 11. The rotor 11 is a permanent magnet having a pair of magnetic poles (N pole and S pole). The stator 12 includes three coils 13 (referred to as coils 13$u$, 13$v$, and 13$w$ when distinguished). The coils 13 are positioned so that directions from the rotation shaft 14 to the coils 13 are shifted by 120°. In the coils 13, first ends of windings are connected to a motor driver described later (motor driver 311 of FIG. 5) and second ends are connected to each other.

For convenience of the following description, a direction to the coil 13$u$ from the rotation shaft 14 is defined as a 0° direction (referred to also as an upward direction). A direction opposite to the 0° direction is defined as a 180° direction (referred to also as a downward direction). A direction at an angle of 90° from the 0° or 180° direction on the coil 13$w$ side is defined as a 270° direction (referred to also as a leftward direction). A direction at an angle of 90° from the 0° or 180° direction on the coil 13$v$ side is defined as a 90° direction (referred to also as a rightward direction). In this case, the coil 13$u$ is positioned at 0°, the coil 13$v$ is positioned at 120°, and the coil 13$w$ is positioned at 240°. The motor 10 is a three-phase motor configured such that the rotor 11 is rotated by three-phase (U, V, and W) currents flowing through the three coils 13. The three phases are shifted by 120°.

The rotor 11 of the motor 10 is the permanent magnet having a pair of magnetic poles but may include permanent magnets having a plurality of pairs of magnetic poles. The stator 12 includes the three coils 13 but may include more than three coils, provided that the count is a multiple of 3.

Figure 3:
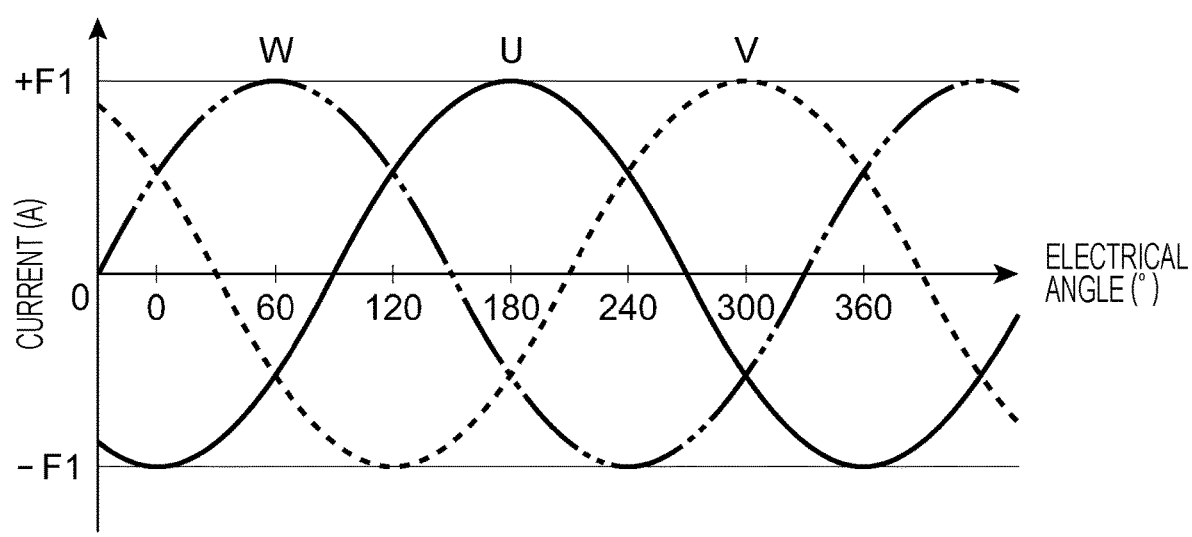
FIG. 3 illustrates an example of three-phase currents that flow through coils of a stator.

FIG. 3 illustrates an example of the three-phase currents that flow through the coils 13 of the stator 12. In FIG. 3, the vertical axis represents a current (A) and the horizontal axis represents an electrical angle(°. The electrical angle refers to a phase under the assumption that one period of a current represented by a sine wave is 360° (2$\pi$ radians) (i.e. the phase is a point within a period). The electrical angle is an electrical angle with respect to a d-axis direction in vector control. The d-axis direction is a direction of the N pole of the rotor 11.

In this example, a U-phase current (current that flows through the coil 13*u*) is "−F1" at an electrical angle of 0°, "0" at 90°, "F1" at 180°, "0" at 270°, and "−F1" again at 360°. A V-phase current (current that flows through the coil 13*v*) is "0" at an electrical angle of 30°, "−F1" at 120°, "0" at 210°, "F1" at 300°, and "0" again at 390°. A W-phase current (current that flows through the coil 13*w*) is "F1" at an electrical angle of 60°, "0" at 150°, "−F1" at 240°, "0" at 330°, and "F1" again at 420°.

FIGS. 4A to 4C illustrate rotation of the rotor 11 of the motor 10. FIG. 4A illustrates a state in which currents flow at an electrical angle of 0° in FIG. 3. FIG. 4B illustrates a state in which the rotor 11 starts to rotate. FIG. 4C illustrates a state in which the rotor 11 is rotating. In FIG. 4A, the direction of the N pole of the rotor 11 is the 0° direction of the motor 10 defined in FIG. 2, and the direction of the S pole is the 180° direction of the motor 10.

In FIG. 4A, currents are caused to flow through the coils 13 at an electrical angle of 90° in FIG. 3. Then, the currents flow in the V phase and the W phase. The V-phase current flows through the coil 13*v* and the W-phase current flows through the coil 13*w*. Since the U-phase current is "0", no current flows through the coil 13*u*. A magnetic field is formed such that the N pole is at 270° and the S pole is at 90° in the motor 10. As illustrated in FIG. 4B, the N pole of the rotor 11 is attracted toward the S pole of the formed magnetic field and the S pole of the rotor 11 is attracted toward the N pole of the formed magnetic field. Thus, the rotor 11 starts to rotate clockwise. The term "clockwise" is a direction from the coil 13*u* to the coil 13*w* via the coil 13*v* (the angle indicating a direction in FIG. 2 increases). The rotor 11 rotates as illustrated in FIG. 4C, and the N pole and the S pole of the magnetic field formed by the currents rotate clockwise when the currents flowing through the coils 13 change in response to a change in the electrical angle illustrated in FIG. 3. This magnetic field is referred to as a rotating magnetic field. The N pole and the S pole of the rotor 11 rotate by being attracted toward the S pole and the N pole of the rotating magnetic field, respectively. That is, the rotor 11 of the motor 10 rotates such that the rotating magnetic field is formed by the currents flowing through the coils 13 and the N pole and the S pole of the rotor 11 are continuously attracted to the rotating magnetic field. In other words, the motor 10 rotates. The currents flowing through the coils 13 are controlled by the motor control apparatus 30.

In the motor 10 including the rotor 11 having a pair of magnetic poles and the three coils 13 where the three-phase currents flow, the position of the rotor 11 coincides with the electrical angle.

FIG. 5 illustrates the motor driver 311 (see FIG. 8) of the motor control apparatus 30, which applies voltages in the respective phases of the motor 10. FIG. 5 also illustrates the motor 10, the encoder 20, and a pulse width modulation (PWM) converter 317 (see FIG. 8) that supplies pulse width modulation signals (hereinafter referred to as PWM signals) to the motor driver 311. The PWM signal is a pulse signal formed by repeating ON/OFF of a voltage. A voltage is applied in association with an ON pulse width.

The motor driver 311 includes half-bridge circuits 40 that supply voltages in the U phase, the V phase, and the W phase of the motor 10 (referred to as half-bridge circuits 40*u*, 40*v*, and 40*w* when distinguished). Each half-bridge circuit 40 includes a p-channel FET 41 and an n-channel FET 42 connected in series. A node between the p-channel FET 41 and the n-channel FET 42 of each half-bridge circuit 40 (node between a drain of the p-channel FET 41 and a drain of the n-channel FET 42) is connected to a corresponding phase of the motor 10. That is, the node of the half-bridge circuit 40*u* is connected to the U phase of the motor 10, the node of the half-bridge circuit 40*v* is connected to the V phase of the motor 10, and the node of the half-bridge circuit 40*w* is connected to the W phase of the motor 10. A feedback diode 43 is connected in parallel to the p-channel FET 41. A feedback diode 44 is connected in parallel to the n-channel FET 42. A source of the p-channel FET 41 is connected to a power source. A source of the n-channel FET 42 is grounded via a resistor R. Currents i (referred to as currents iu, iv, and iw when distinguished) flowing through the respective half-bridge circuits 40 are detected by the resistors R. The feedback diodes 43 and 44 return, to the power source, energy accumulated in the coil 13 connected to the half-bridge circuit 40. The p-channel FET 41 is an example of a high-side switching element. The n-channel FET 42 is an example of a low-side switching element.

The PWM converter 317 supplies PWM signals to a gate of the p-channel FET 41 and a gate of the n-channel FET 42 in each half-bridge circuit 40. That is, the PWM converter 317 applies a voltage VH (referred to as a voltage VHu, VHv, or VHw when distinguished) as the PWM signal to the gate of the p-channel FET 41, and a voltage VL (referred to as a voltage VLu, VLv, or VLw when distinguished) as the PWM signal to the gate of the n-channel FET 42. The p-channel FET 41 and the n-channel FET 42 of each half-bridge circuit 40 are turned ON or OFF by the supplied PWM signals. The p-channel FET 41 or the n-channel FET 42 that is turned ON applies a voltage to each phase of the motor 10 and a current flows through the coil 13 of the stator 12. The ratios between an ON period and an OFF period (duty ratios) are switched for the half-bridge circuits 40 so that the currents represented by the sine waves in FIG. 3 flow in the respective phases of the motor 10 on average. For example, if the p-channel FET 41 of the half-bridge circuit 40*u* and the n-channel FET 42 of the half-bridge circuit 40*v* are ON, a current flows via the p-channel FET 41 of the half-bridge circuit 40*u*, the coil 13*u*, the coil 13*v*, and the n-channel FET 42 of the half-bridge circuit 40*v*. At this time, the current flows from the first end to the second end in the coil 13*u* and from the second end to the first end in the coil 13*v*. The current flowing from the first end to the second end in the coil 13 is positive, and the current flowing from the second end to the first end in the coil 13 is negative.

If the p-channel FET 41 and the n-channel FET 42 connected in series are simultaneously ON in the half-bridge circuit 40, a current flows though the half-bridge circuit 40 from the power source to the ground. This current may be referred to as a through-current. To reduce the occurrence of the case where the p-channel FET 41 and the n-channel FET 42 are simultaneously ON (the through-current flows), a so-called dead time is provided between the ON period of the p-channel FET 41 and the ON period of the n-channel FET 42. The dead time is a period in which both the p-channel FET 41 and the n-channel FET 42 are OFF.

Figure 6A:
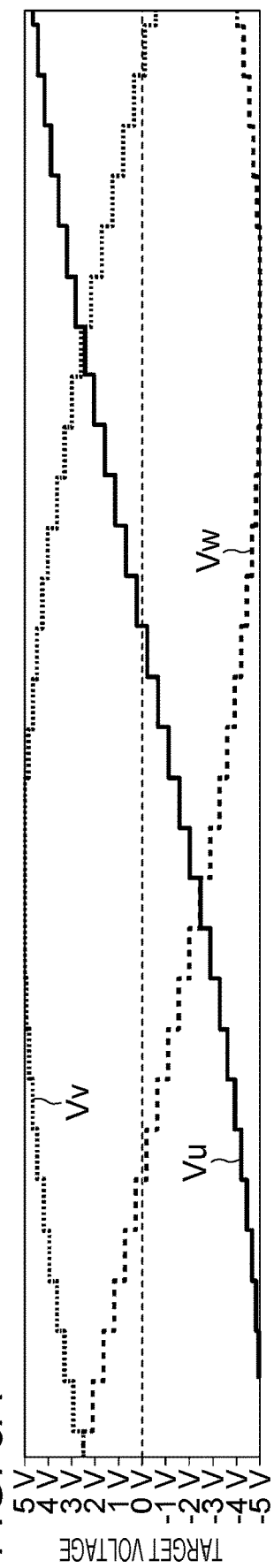
Figure 6B:
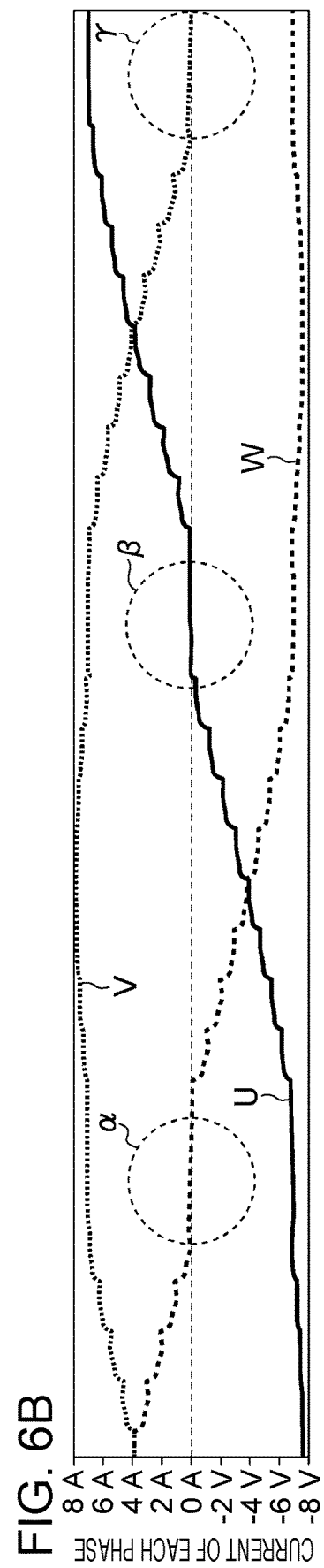
Figure 6C:
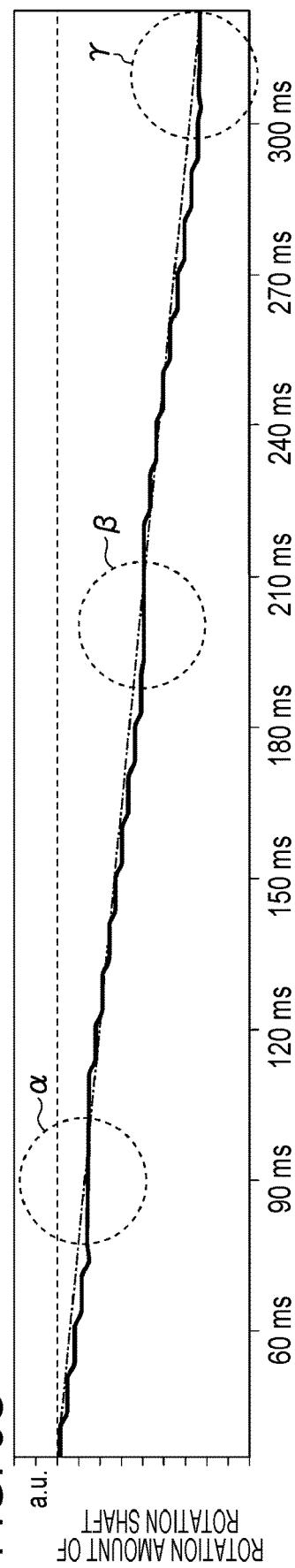

FIGS. 6A to 6C illustrate an example of relationships among target voltages (Vv, Vu, and Vw) set in the respective phases of the motor 10, currents flowing in the respective phases of the motor 10, and the rotation amount of the rotation shaft 14 of the motor 10. FIG. 6A illustrates the target voltages set in the respective phases of the motor 10. FIG. 6B illustrates the currents flowing in the respective phases of the motor 10. FIG. 6C illustrates the rotation amount of the rotation shaft 14 of the motor 10. Each horizontal axis represents time. In FIG. 6C, the chain line represents an ideal case where the rotation amount of the rotation shaft 14 of the motor 10 changes in proportion to time.

In FIG. 6A, the target voltages (Vv, Vu, and Vw) are set stepwise in the respective phases of the motor 10 so as to be approximate to sine waves. That is, the motor driver 311 changes the voltages to be applied in the U phase, the V phase, and the W phase of the motor 10 with an elapse of time. Thus, the rotor 11 of the motor 10 is rotated by currents flowing in the U phase, the V phase, and the W phase of the motor 10. However, the currents flowing in the respective phases (U, V, and W) of the motor 10 are not approximate to sine waves as illustrated in FIG. 6B. In FIG. 6B, deviations from sine waves are particularly large at a portion where the target voltage Vw intersects 0 V in FIG. 6A (portion α), a portion where the target voltage Vu intersects 0 V (portion β), and a portion where the target voltage Vv intersects 0 V (portion γ).

Therefore, the rotation amount of the rotation shaft 14 deviates from the ideal rotation amount of the rotation shaft 14 represented by the chain line in FIG. 6C. In FIG. 6C, the deviation is particularly large at the portion where the target voltage Vw intersects 0 V in FIG. 6A (portion α), the portion where the target voltage Vu intersects 0 V (portion β), and the portion where the target voltage Vv intersects 0 V (portion γ). The intersection of the target voltage with 0 V or the intersection of the current with 0 A may be referred to as a zero cross.

As illustrated in FIG. 6A, currents approximate to sine waves do not flow in the respective phases of the motor 10 even if the target voltages are set stepwise in the respective phases of the motor 10 so as to be approximate to sine waves. Therefore, the motor 10 may have deviations in positional control for the rotor 11, consume more electric power due to misalignment of the rotor 11 from a predetermined position, or have fluctuations in the rotation speed of the rotor 11. Those phenomena are caused by the dead time for preventing the occurrence of the case where the high-side switching element (p-channel FET 41) and the low-side switching element (n-channel FET 42) are simultaneously ON.

FIG. 7 illustrates the hardware configuration of the motor control apparatus 30. The motor control apparatus 30 includes a CPU 31, a ROM 32, a RAM 33, an input/output interface (hereinafter referred to as an input/output IF) 34, a communication interface (hereinafter referred to as a communication IF) 35, and a bus 36. The CPU 31, the ROM 32, the RAM 33, the input/output IF 34, and the communication IF 35 are connected to each other via the bus 36. Although illustration is omitted, the motor control apparatus 30 may include an HDD. The HDD is also connected to the bus 36.

The input/output IF 34 is connected to the motor driver 311. The motor driver 311 is connected to the motor 10. The input/output IF 34 is also connected to the encoder 20. The communication IF 35 is connected to a different control apparatus (or a CPU) (not illustrated). The portion enclosed by the broken line is an example of a controller.

When powered ON, the CPU 31 reads a program and data stored in the ROM 32 (or the HDD) and loads and writes the program on the RAM 33 into an executable state. Then, the CPU 31 executes the program. Along with the execution of the program, the CPU 31 exchanges data with the RAM 33, the input/output IF 34, and the communication IF 35.

The input/output IF 34 supplies voltages in the respective phases of the motor 10 via the motor driver 311 and acquires A-phase and B-phase pulses from the encoder 20. The communication IF 35 acquires, from a different control apparatus, a command to start or stop the rotation of the motor 10 and commands (may be referred to as command values) related to control for a rotation speed, a stop position, and the like. The communication IF 35 outputs, to a different control apparatus, a status of start or stop of the rotation of the motor 10 and information (may be referred to as data) related to statuses of the rotation speed, the stop position, and the like.

For example, the ROM 32 (or the HDD) is an EPROM, an EEPROM, or a flash memory and stores a program and data for use in the program, such as constants and initial values of variables. The RAM 33 may be a rewritable non-volatile memory such as a flash memory.

Figure 8:
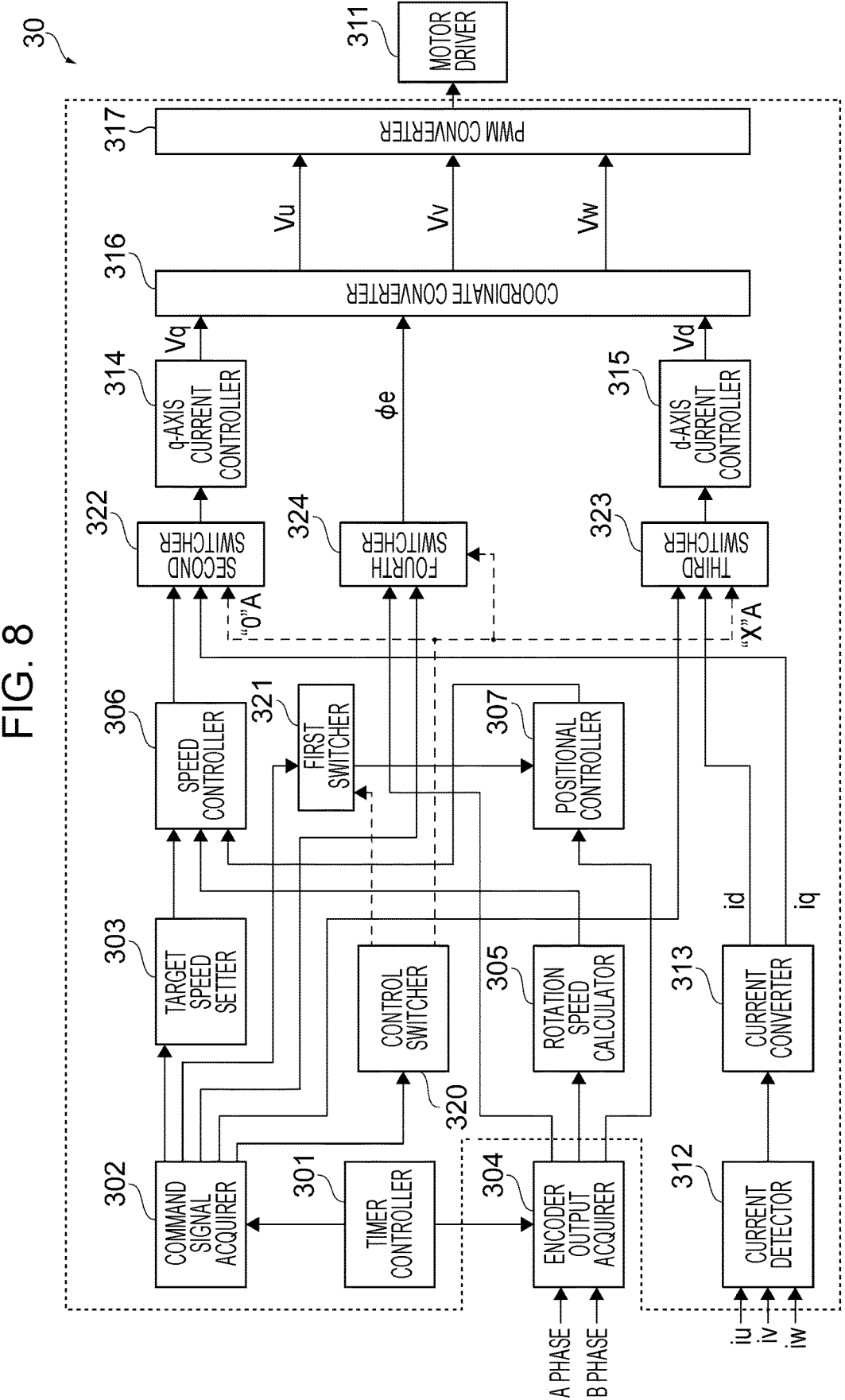
FIG. 8 illustrates an example of the functional configuration of the motor control apparatus according to the first exemplary embodiment.

FIG. 8 illustrates an example of the functional configuration of the motor control apparatus 30 according to the first exemplary embodiment. The motor control apparatus 30 includes a timer controller 301, a command signal acquirer 302, a target speed setter 303, an encoder output acquirer 304, a rotation speed calculator 305, a speed controller 306, a positional controller 307, the PWM converter 317, a current detector 312, a current converter 313, a q-axis current controller 314, a d-axis current controller 315, a coordinate converter 316, a control switcher 320, a first switcher 321, a second switcher 322, a third switcher 323, and a fourth switcher 324. The timer controller 301 and other parts are referred to as functional parts.

The brushless motor 1 is controlled by rotation control for rotating the rotor 11 at a predetermined rotation speed, and by field fixing control for starting the rotation of the brushless motor 1 in response to power-ON or setting a stop position of the rotor 11. The brushless motor 1 does not have a sensor that detects the position of the rotor 11 (direction of the N pole of the rotor 11). Therefore, after the brushless motor 1 is powered ON, the field fixing control is performed to adjust the position of the rotor 11 and a control electrical angle. This operation is referred to as initial positional adjustment. After the initial positional adjustment, the rotation control is performed to control the rotation of the rotor 11 of the motor 10. The field fixing control is also performed to stop the rotor 11 after the rotation. That is, the brushless motor 1 is controlled by switching the rotation control and the field fixing control. The field fixing control is to fix the rotor 11 to a specified position in terms of the electrical angle. Specifically, the position of the rotor 11 is fixed to a predetermined position by a magnetic field (referred to as a field) formed by currents flowing through the coils 13 of the stator 12.

In vector control, the field fixing control involves specifying an electrical angle and setting the q-axis current to 0 A and the d-axis current to a given value. The rotation control involves setting the q-axis current. The d-axis current may be set in the rotation control. The phase of the q-axis current advances by 90° from the phase of the d-axis current.

The control switcher 320 switches the first switcher 321, the second switcher 322, the third switcher 323, and the fourth switcher 324 based on a command signal acquired by the command signal acquirer 302, thereby switching the rotation control and the field fixing control. In FIG. 8, the control of the control switcher 320 is represented by broken lines and constants to be set in the field fixing control are noted. In this case, constants in the initial positional adjustment are noted. Functional parts for the rotation control are described first.

The timer controller 301 generates signals in predetermined periods and supplies the signals to the command signal acquirer 302 and the encoder output acquirer 304. Command signals for a rotation direction and a rotation speed or a rotation position (stop position of the rotor 11) are input to the command signal acquirer 302 from a different control apparatus. The command signal acquirer 302 acquires command signals input within a period between preceding signal supply from the timer controller 301 and subsequent signal supply from the timer controller 301. Examples of the different control apparatus include an apparatus that controls the operation of the load 2.

The command signal acquirer 302 supplies the command signal indicating a rotation speed to the target speed setter 303, and supplies the command signal indicating the position of the rotor 11 to the positional controller 307 via the first switcher 321. The command signal acquirer 302 supplies a command signal indicating a d-axis current (described later) to the d-axis current controller 315 via the third switcher 323. The command signal acquirer 302 supplies a command signal indicating an electrical angle φe to the coordinate converter 316 via the fourth switcher 324.

The target speed setter 303 sets a target speed to the rotation speed indicated by the command signal supplied from the command signal acquirer 302, and supplies the set target speed to the speed controller 306.

Rotation signals (A-phase and B-phase pulses) are input to the encoder output acquirer 304 from the encoder 20 illustrated in FIG. 5. The encoder output acquirer 304 acquires rotation signals input within a period between preceding signal supply from the timer controller 301 and subsequent signal supply from the timer controller 301. The encoder output acquirer 304 supplies the acquired rotation signals to the rotation speed calculator 305 and the positional controller 307, and also to the coordinate converter 316 via the fourth switcher 324. The encoder output acquirer 304 is an example of an acquirer that acquires rotation information output from the encoder 20.

The rotation speed calculator 305 calculates a rotation speed of the rotor 11 by using the rotation signals supplied from the encoder output acquirer 304. For example, the rotation speed calculator 305 calculates the rotation speed based on the numbers of pulses per unit time indicated by the rotation signals. The calculated rotation speed corresponds to a measurement value of a current rotation speed of the rotor 11. The rotation speed calculator 305 supplies the calculated rotation speed to the speed controller 306.

The speed controller 306 performs speed control so that the rotation speed of the rotor 11 supplied from the rotation speed calculator 305 is made closer to the target speed set by the target speed setter 303. For example, the speed controller 306 performs the speed control by using proportional-integral (PI) control, which is one type of feedback control.

The speed controller 306 makes the rotation speed closer to the target speed in the following manner. The speed controller 306 supplies a command value of a q-axis current (value corresponding to the calculated rotation speed and the set target speed) to the q-axis current controller 314 via the second switcher 322. The q-axis current is one of two-axis currents (d-axis and q-axis currents) obtained by converting the three-phase currents flowing through the coils 13. The speed controller 306 performs control so that a value of the q-axis current (iq described later) obtained by converting the measured currents flowing through the coils 13 is made closer to the command value.

The positional controller 307 sets a target position to the position of the rotor 11 indicated by the command signal supplied via the first switcher 321, and performs positional control so that the position of the rotor 11 is made closer to the target position by using, for example, proportional (P) control. At the time of rotation control, the initial position of the rotor 11 has already been detected. The positional controller 307 detects a current position of the rotor 11 based on the detected initial position and the rotation direction and the rotation amount indicated by the rotation signals supplied from the encoder output acquirer 304.

The positional controller 307 calculates a deviation between the detected current position of the rotor 11 and the rotation position (stop position of the rotor 11) indicated by the command signal supplied from the command signal acquirer 302 via the first switcher 321. The positional controller 307 repeatedly supplies the calculated deviation to the speed controller 306 and stops the rotor 11 at the rotation position by performing, for example, control so that the speed is set to "0" when the deviation is "0".

The current detector 312 acquires the three-phase currents iu, iv, and iw flowing through the half-bridge circuits 40u, 40v, and 40w of the motor driver 311 of FIG. 5, and supplies the three-phase currents iu, iv, and iw to the current converter 313. The current converter 313 converts the three-phase currents iu, iv, and iw into currents iα and iβ in a two-phase orthogonal fixed coordinate system by Clarke transformation. Further, the current converter 313 obtains a d-axis current id and a q-axis current iq by converting fixed coordinates of the currents iα and iβ into rotating coordinates by Park transformation. The current converter 313 supplies the q-axis current iq to the q-axis current controller 314 via the second switcher 322 and the d-axis current id to the d-axis current controller 315 via the third switcher 323.

The q-axis current controller 314 performs control so that the q-axis current iq supplied from the current converter 313 is made closer to the command value of the q-axis current supplied from the speed controller 306 by using, for example, PI control. The q-axis current controller 314 supplies the q-axis current iq and a command value of a q-axis voltage Vq obtained based on the command value of the q-axis current to the coordinate converter 316. The d-axis current controller 315 performs control so that the d-axis current id supplied from the current converter 313 is made closer to a command value of the d-axis current supplied from the different control apparatus via the third switcher 323 by using, for example, PI control. The d-axis current controller 315 supplies the d-axis current id and a command value of a d-axis voltage Vd obtained based on the command value of the d-axis current to the coordinate converter 316.

If the initial position of the rotor 11 has already been detected, the coordinate converter 316 determines a current electrical angle based on the initial position of the rotor 11 and the rotation direction and the rotation amount indicated by the rotation signals supplied from the encoder output acquirer 304. By using the determined electrical angle, the coordinate converter 316 converts coordinates of the command value of the q-axis voltage supplied from the q-axis current controller 314 and the command value of the d-axis voltage supplied from the d-axis current controller 315 into coordinates of target voltage values (Vu, Vv, and Vw) of the respective phases (U, V, and W phases) by spatial vector conversion.

The PWM converter 317 converts the three-phase voltage value coordinates into voltage signals serving as PWM signals, and supplies the voltage signals to the motor driver 311.

Next, description is made of functional parts that perform the field fixing control in the initial positional adjustment.

The description is made below in comparison with the rotation control. As described above, the control switcher 320 controls the first switcher 321, the second switcher 322, the third switcher 323, and the fourth switcher 324 to switch pieces of information to be supplied to the respective downstream functional parts for the rotation control and for the field fixing control.

In the rotation control, the control switcher 320 controls the first switcher 321 to supply, to the downstream positional controller 307, the command signal indicating the position of the rotor 11 acquired by the command signal acquirer 302. In the field fixing control in the initial positional adjustment, the control switcher 320 controls the first switcher 321 to supply, to the downstream positional controller 307, the position acquired by the command signal acquirer 302 as a target position for the initial position of the rotor 11.

In the rotation control, the control switcher 320 controls the second switcher 322 to supply, to the downstream q-axis current controller 314, the command value of the q-axis current from the speed controller 306 and the q-axis current iq from the current converter 313. In the field fixing control in the initial positional adjustment, the control switcher 320 controls the second switcher 322 to supply, to the downstream q-axis current controller 314, a command value of a q-axis current having a current value of 0 A.

In the rotation control, the control switcher 320 controls the third switcher 323 to supply, to the downstream d-axis current controller 315, the command value of the d-axis current from the different control apparatus and the d-axis current id from the current converter 313. In the field fixing control in the initial positional adjustment, the control switcher 320 controls the third switcher 323 to supply, to the downstream d-axis current controller 315, a command value of a d-axis current having a predetermined current value ("X" A).

In the rotation control, the control switcher 320 controls the fourth switcher 324 to supply the rotation signals from the encoder output acquirer 304 to the downstream coordinate converter 316. In the field fixing control in the initial positional adjustment, the control switcher 320 controls the fourth switcher 324 to supply, to the downstream coordinate converter 316, a command value for gradually changing the electrical angle.

The command signal acquirer 302 is implemented by the communication IF 35 of FIG. 7. The PWM converter 317, the encoder output acquirer 304, and the current detector 312 are implemented by the input/output IF of FIG. 7. The functional parts other than the motor driver 311 are implemented by the CPU 31, the ROM 32, and the RAM 33 of FIG. 7. The portion enclosed by the broken line is an example of the controller.

(Initial Positional Adjustment for Rotor 11 by Field Fixing Control)

Next, description is made of the initial positional adjustment for the rotor 11 in the first exemplary embodiment.

The encoder 20 of the brushless motor 1 supplies rotation signals (A phase and B phase) to the motor control apparatus 30. The rotation direction and the rotation speed of the rotation shaft 14 of the motor 10 are determined based on the rotation signals (A phase and B phase). However, the position of the rotor 11 of the motor 10 is not determined when the brushless motor 1 is powered ON. Therefore, when the brushless motor 1 is powered ON, the motor control apparatus 30 adjusts the position of the rotor 11 and the control electrical angle to control the rotation of the motor 10. This operation is the initial positional adjustment.

The initial positional adjustment involves forming a magnetic field by supplying currents to the coils 13 of the stator 12 of FIG. 2, and stopping the rotor 11 at a predetermined position. That is, the initial positional adjustment involves specifying an electrical angle and supplying currents corresponding to the electrical angle to the coils 13 to form a magnetic field (field) in the stator 12. The rotor 11 is rotated to and stopped at the specified position in terms of the electrical angle, thereby adjusting the position of the rotor 11 and the control electrical angle. When the electrical angle for the initial positional adjustment is specified near the zero cross of the voltage, however, a deviation is likely to occur in the current flowing through the coil 13 as illustrated in FIGS. 6A to 6C. Therefore, a deviation is likely to occur in the stop position of the rotor 11. That is, the initial positional adjustment may fail. The failure in the initial positional adjustment may lead to deviations in the positional control for the rotor 11, an increase in the power consumption, and fluctuations in the rotation speed during the driving of the motor 10.

In the first exemplary embodiment, the electrical angle for the initial positional adjustment is specified outside ranges including the zero crosses.

Figure 9A:
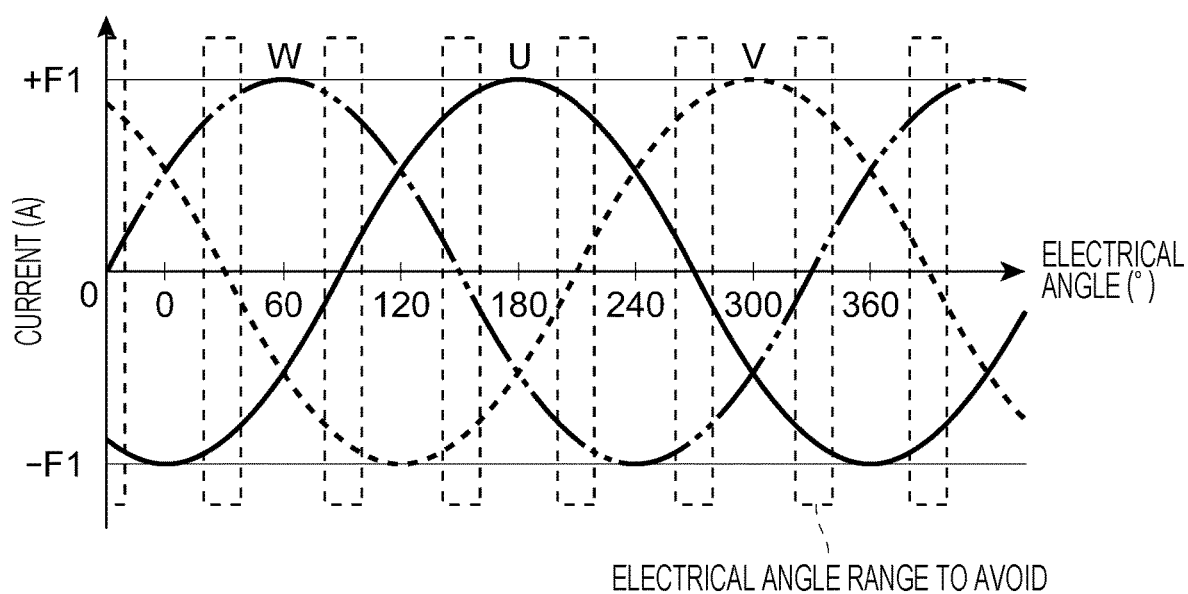
Figure 9B:
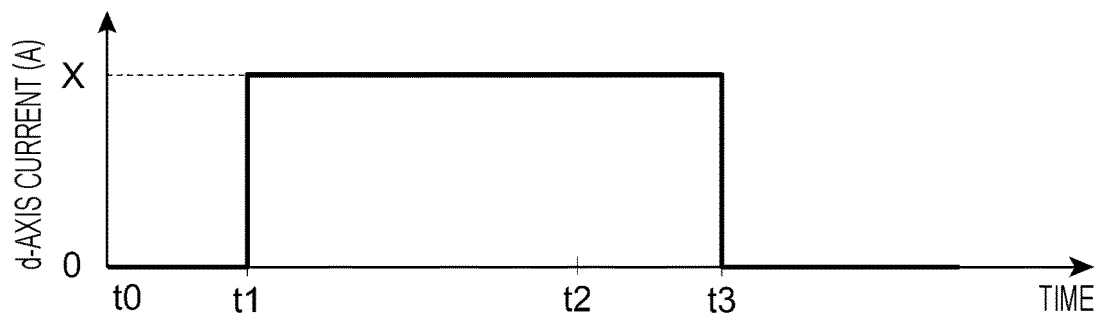
Figure 9C:
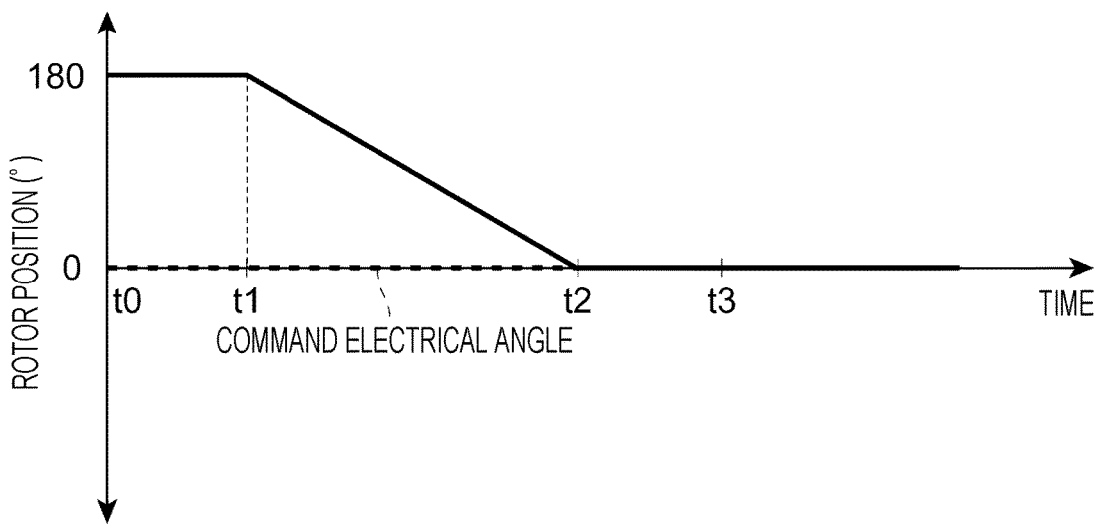

FIGS. 9A to 9C illustrate the initial positional adjustment in the first exemplary embodiment. FIG. 9A illustrates the currents flowing in the respective phases of the motor 10. FIG. 9B illustrates the d-axis current. FIG. 9C illustrates the position of the rotor 11. In FIG. 9A, the vertical axis represents a current (A) and the horizontal axis represents an electrical angle)(°. In FIG. 9B, the vertical axis represents a d-axis current (A) and the horizontal axis represents time. In FIG. 9C, the vertical axis represents a position of the rotor)(° and the horizontal axis represents time. In the horizontal axes of FIGS. 9B and 9C, time elapses in order of a time to, a time t1, a time t2, . . . .

As described above, the initial positional adjustment for the rotor 11 by the field fixing control involves setting the d-axis current. In the initial positional adjustment, the different control apparatus first specifies an electrical angle of the rotor 11. The electrical angle of the rotor 11 to be set by the different control apparatus is hereinafter referred to as a command electrical angle. When the command electrical angle is acquired from the different control apparatus, the motor control apparatus 30 supplies currents to the coils 13 of the stator 12 to set the rotor 11 at a position corresponding to the command electrical angle. The command electrical angle is set while avoiding electrical angles enclosed by broken lines in FIG. 9A. The electrical angles to avoid are near the zero crosses in the U phase, the V phase, and the W phase.

At the time t0 in FIGS. 9B and 9C, the position of the rotor 11 prior to the initial positional adjustment is, for example, 180°. The command electrical angle from the different control apparatus for stopping the rotor 11 is, for example, 0°. At the time of power-ON, the motor control apparatus 30 does not grasp the position of the rotor 11. As illustrated in FIG. 9A, U-phase, V-phase, and W-phase currents at the command electrical angle of 0° are outside the ranges including the zero crosses. That is, the command electrical angle of 0° is set while avoiding the electrical angles near the zero crosses.

At the time t1, the motor control apparatus 30 starts to supply a d-axis current for setting the rotation speed of the rotor 11. The d-axis current is "X" A. A field formed by the d-axis current of "X" A causes the rotor 11 to rotate from 180° toward 0°. At the time t2, the rotor 11 is positioned at 0° and fixed with its rotation stopped. As illustrated in FIG.

9A, the d-axis current is set to 0 A at the time t3. A relationship of "time t1<time t2≤time t3" holds. The motor control apparatus 30 determines the position of the rotor 11 (0°) as a control electrical angle (0°).

Even if the number of magnetic poles of the rotor 11 is not two but four, six, or eight or the number of coils 13 of the stator 12 is not three but six, nine, or twelve, the rotor 11 is fixed at the position corresponding to the command electrical angle (field fixing).

In the initial positional adjustment, determination as to whether the rotor 11 is fixed to the position of 0° may be made based on an elapse of a preset period (t2–t1) from the time t1 when the d-axis current starts to flow, or in response to the encoder 20 detecting a stop of the rotation based on the rotation amount of the rotor 11.

After the initial positional adjustment for the rotor 11 is finished, the rotor 11 may be returned to the position at the time of power-ON (prior to the initial positional adjustment) by reversely rotating the rotor 11 by a rotation amount within the period of the initial positional adjustment (from the time t1 to the time t2). This rotation amount is acquired by the motor control apparatus 30 from the encoder 20. At this time, the electrical angle corresponding to the position of the rotor 11 at the time of power-ON (prior to the initial positional adjustment) is calculated based on the command electrical angle and the rotation amount of the rotor 11.

As described above, in the first exemplary embodiment, the command electrical angle is set while avoiding the electrical angles at which the U-phase, V-phase, or W-phase current is near the zero cross. For example, FIG. 9A demonstrates that the electrical angles of 30°, 90°, 150°, 210°, 270°, and 330° in the d-axis current are electrical angles at which the U-phase, V-phase, or W-phase current is near the zero cross. Thus, the command electrical angle may be set while avoiding those electrical angles near the zero crosses.

The phrase "near the zero cross" refers to a range of, for example, less than ±10° with respect to the electrical angle at the zero cross.

Second Exemplary Embodiment

In the first exemplary embodiment, the initial positional adjustment is performed by setting the command electrical angle while avoiding the electrical angles at which the U-phase, V-phase, or W-phase current is near the zero cross. In a second exemplary embodiment, the initial positional adjustment is performed by setting the command electrical angle to an electrical angle at which the U-phase, V-phase, or W-phase current has a maximum absolute value (see FIG. 10A). The other configuration is similar to that in the first exemplary embodiment and therefore description thereof is omitted.

As illustrated in FIG. 9A, the electrical angle at which the U-phase, V-phase, or W-phase current has a maximum absolute value corresponds to 0° at which the U-phase current is maximum on the negative side, 60° at which the W-phase current is maximum on the positive side, 120° at which the V-phase current is maximum on the negative side, 180° at which the U-phase current is maximum on the positive side, 240° at which the W-phase current is maximum on the negative side, and 300° at which the V-phase current is maximum on the positive side. At those electrical angles, currents of phases other than a phase of the maximum absolute value are not near the zero cross.

Third Exemplary Embodiment

In the second exemplary embodiment, the command electrical angle is set and the rotor 11 is fixed at a position corresponding to the electrical angle by field fixing. In a third exemplary embodiment, the rotation amount of the rotor 11 is reduced in the initial positional adjustment. The other configuration is similar to that in the first exemplary embodiment and therefore description thereof is omitted.

Figure 10A:
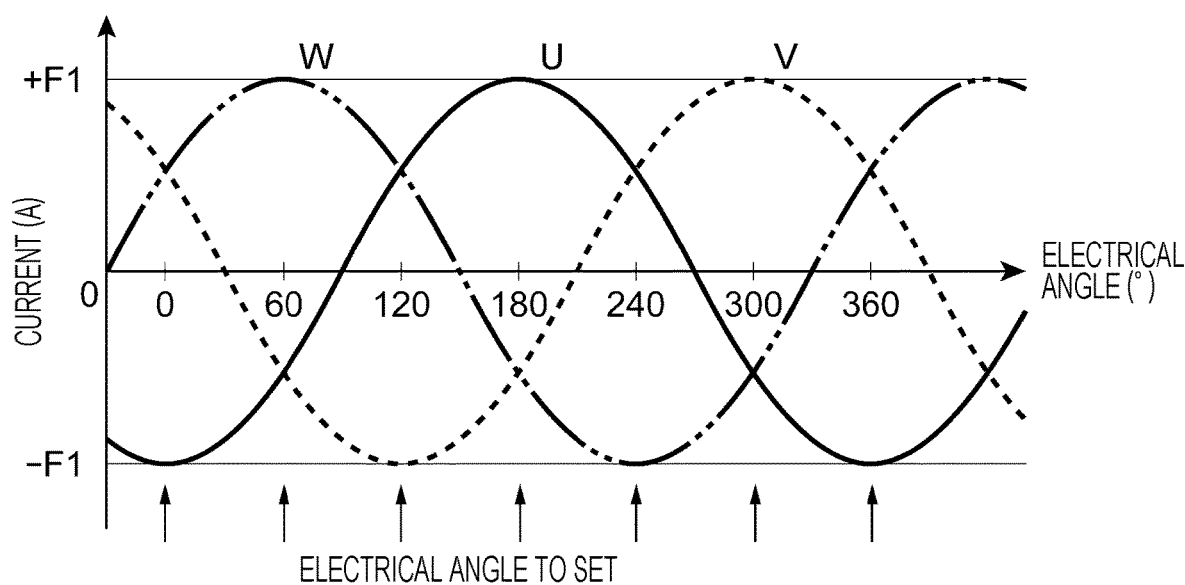
Figure 10B:
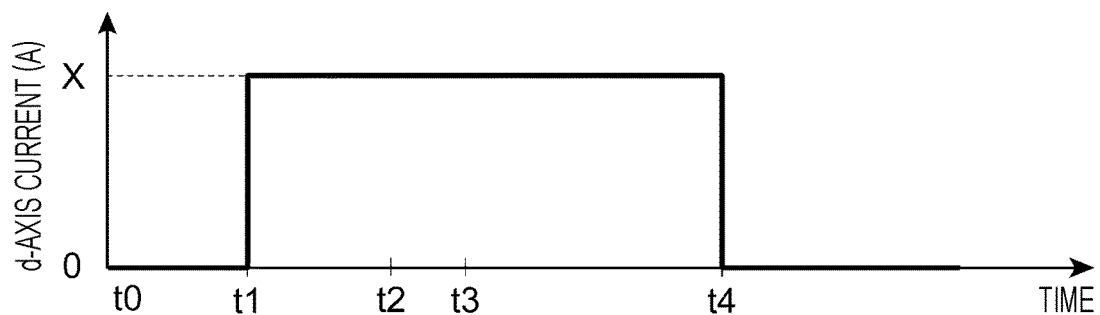
Figure 10C:
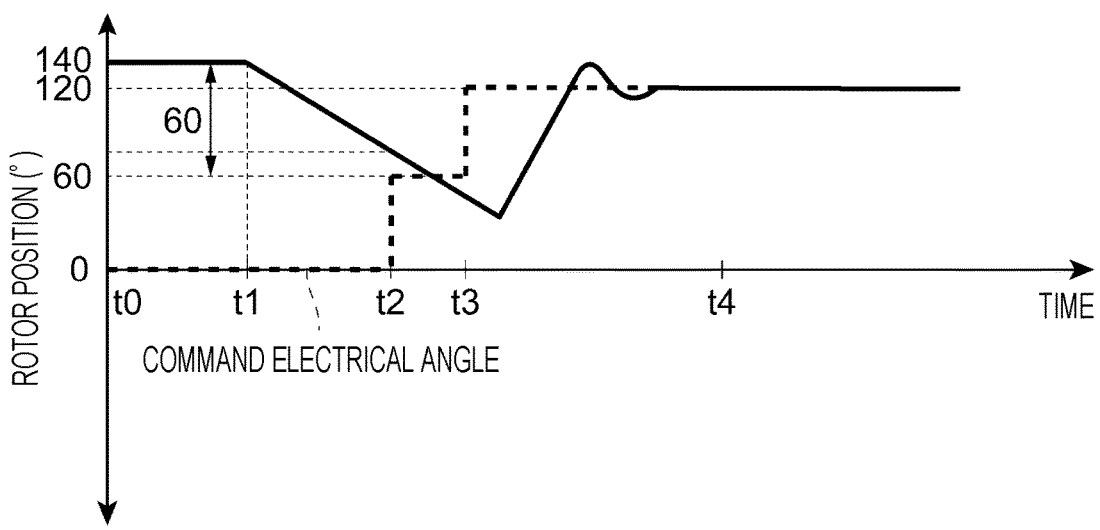

FIGS. 10A to 10C illustrate the initial positional adjustment in the third exemplary embodiment. FIG. 10A illustrates the currents flowing in the respective phases of the motor 10. FIG. 10B illustrates the d-axis current. FIG. 10C illustrates the position of the rotor 11. In FIG. 10A, the vertical axis represents a current (A) and the horizontal axis represents an electrical angle)(°. In FIG. 10B, the vertical axis represents a d-axis current (A) and the horizontal axis represents time. In FIG. 10C, the vertical axis represents a position of the rotor)(° and the horizontal axis represents time. A time t0, a time t1, a time t2, . . . in the horizontal axes of FIGS. 10B and 10C are different from the time t0, the time t1, the time t2, . . . in the horizontal axes of FIGS. 9B and 9C.

For example, the position of the rotor 11 prior to the initial positional adjustment (time t0) is 140°. For example, the command electrical angle is 0°. As illustrated in FIG. 10A, the command electrical angle of 0° is an electrical angle at which the U-phase current is maximum on the negative side (absolute value).

At the time t1, the motor control apparatus 30 starts to supply a d-axis current for setting the rotation speed of the rotor 11. The d-axis current is "X" A. The rotor 11 starts to rotate toward the position of 0°. In this case, the rotor 11 needs to rotate by 140°. The electrical angle illustrated in FIG. 10A coincides with the position of the rotor 11. FIG. 10A demonstrates that the electrical angle of 120° at which the V-phase current has a maximum absolute value is closest to the position of 140° in a direction from the position of 140° to the position of 0°. Since the motor control apparatus 30 does not grasp the position of the rotor 11 at the time of power-ON, the rotor 11 is rotated toward the position corresponding to the command electrical angle of 0°.

In response to detection that the rotation amount of the rotor 11 is equal to or larger than 60° based on rotation information from the encoder 20, the motor control apparatus 30 sets again a new command electrical angle of 60° by adding 60° to the command electrical angle of 0°. At this time, the position of the rotor 11 is 80°. The command electrical angle of 60° is on the same side as that of the previous command electrical angle of 0°. Therefore, the rotor 11 rotates in the same direction toward a position corresponding to the command electrical angle of 60°. In response to detection that the rotor 11 rotates in the same direction though the command electrical angle is set again based on rotation information from the encoder 20, the motor control apparatus 30 sets again a new command electrical angle of 120° by adding 60° to the command electrical angle of 60°. At this time, the position of the rotor 11 is shifted to a position represented by an angle smaller than 80°. Therefore, the command electrical angle of 120° is on a side where the rotor 11 rotates in the opposite direction from the current position. Thus, the rotor 11 starts to rotate in the opposite direction toward a position corresponding to the command electrical angle of 120°. The field is fixed at the position corresponding to the command electrical angle of 120°. That is, the initial positional adjustment is performed by setting the closest position (120° in this example) to the position of the rotor 11 at the time of power-ON (prior to the initial positional adjustment) (140° in this example). The motor control apparatus 30 determines the position of the rotor 11 as a control electrical angle.

In the case of three phases, the currents of the respective phases have maximum absolute values at intervals of 60° in terms of the electrical angle as illustrated in FIG. 10A. Therefore, when the rotor 11 is rotated by 60° or more toward the position corresponding to the command electrical angle, the initial positional adjustment for the rotor 11 is performed in such a manner that the rotor 11 passes over the closest position corresponding to the electrical angle at which the current has a maximum absolute value. Thus, when the rotor 11 rotates by more than 60° based on the rotation information from the encoder 20, the motor control apparatus 30 reduces the command electrical angle by 60°. Then, the motor control apparatus 30 determines whether the rotation direction of the rotor 11 is reversed. If the rotation direction of the rotor 11 is the same, that is, if the rotation direction is not reversed, the motor control apparatus 30 further reduces the command electrical angle by 60°. If the rotation direction is reversed, the motor control apparatus 30 keeps the command electrical angle and fixes the rotor 11 at a position corresponding to the command electrical angle. In this case, the rotor 11 is fixed to the position closest to the initial position of the rotor 11 corresponding to the electrical angle at which the current has a maximum absolute value. The encoder 20 does not grasp the position of the rotor 11 at the time of power-ON but detects the rotation speed and the rotation direction of the rotor 11.

Thus, the load 2 connected to the rotor 11 does not largely deviate from the state before the positional adjustment.

In the above description, the command electrical angle is smaller than the angle corresponding to the position of the rotor 11 at the time of power-ON (prior to the initial positional adjustment). When the command electrical angle is larger than the angle corresponding to the position of the rotor 11 at the time of power-ON (prior to the initial positional adjustment), the rotation direction is reversed.

The angle of 60° is applied in the case where the rotor 11 has a pair of magnetic poles, the stator 12 has three coils, and the motor 10 is driven in the three phases. In other structures, the values may be set depending on the structures. The angle of 60° is an example of a predetermined rotation amount based on the rotation information.

Fourth Exemplary Embodiment

In the first to third exemplary embodiments, the influence of the dead time for preventing the occurrence of the case where the high-side switching element (p-channel FET 41) and the low-side switching element (n-channel FET 42) are simultaneously ON is reduced in the initial positional adjustment for the rotor 11 by the field fixing control. In a fourth exemplary embodiment, a dead time corrector 318 is provided between the coordinate converter 316 and the PWM converter 317 in FIG. 8 to correct waveforms of the voltages (Vu, Vv, and Vw) of the respective phases output from the coordinate converter 316 and supply the voltages to the PWM converter 317.

Figure 11:
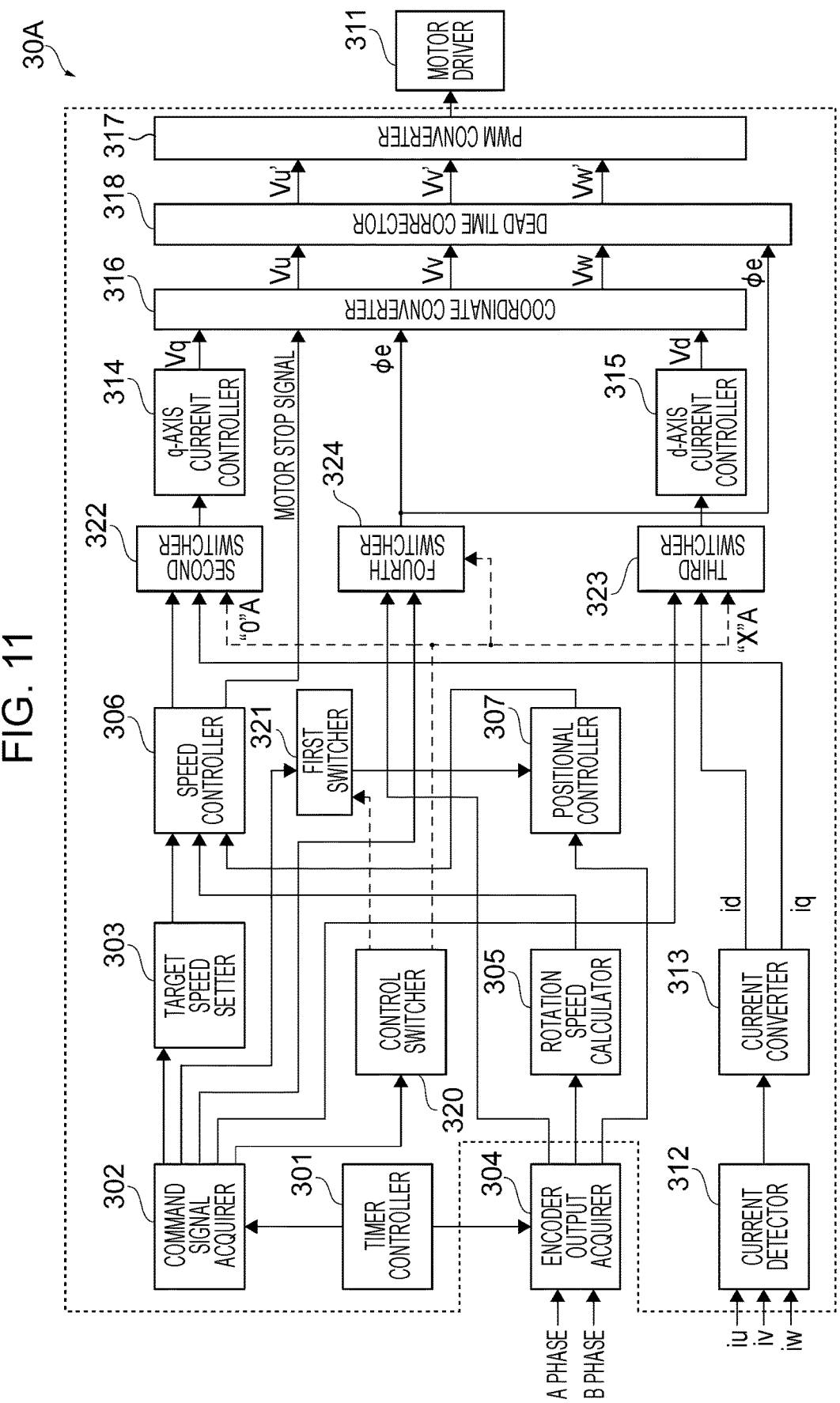
FIG. 11 illustrates an example of the functional configuration of a motor control apparatus according to a fourth exemplary embodiment.

FIG. 11 illustrates an example of the functional configuration of a motor control apparatus 30A according to the fourth exemplary embodiment. The motor control apparatus 30A includes the dead time corrector 318 between the coordinate converter 316 and the PWM converter 317 in the configuration of the motor control apparatus 30 according to the first exemplary embodiment illustrated in FIG. 8. The other configuration is similar to that in the first exemplary embodiment and therefore description thereof is omitted.

The dead time corrector 318 corrects the voltages Vu, Vv, and Vw supplied from the coordinate converter 316 and supplies voltages Vu', Vv', and Vw' to the PWM converter 317. The dead time corrector 318 is supplied with the signal indicating the electrical angle φe input to the coordinate converter 316.

Figure 12A:
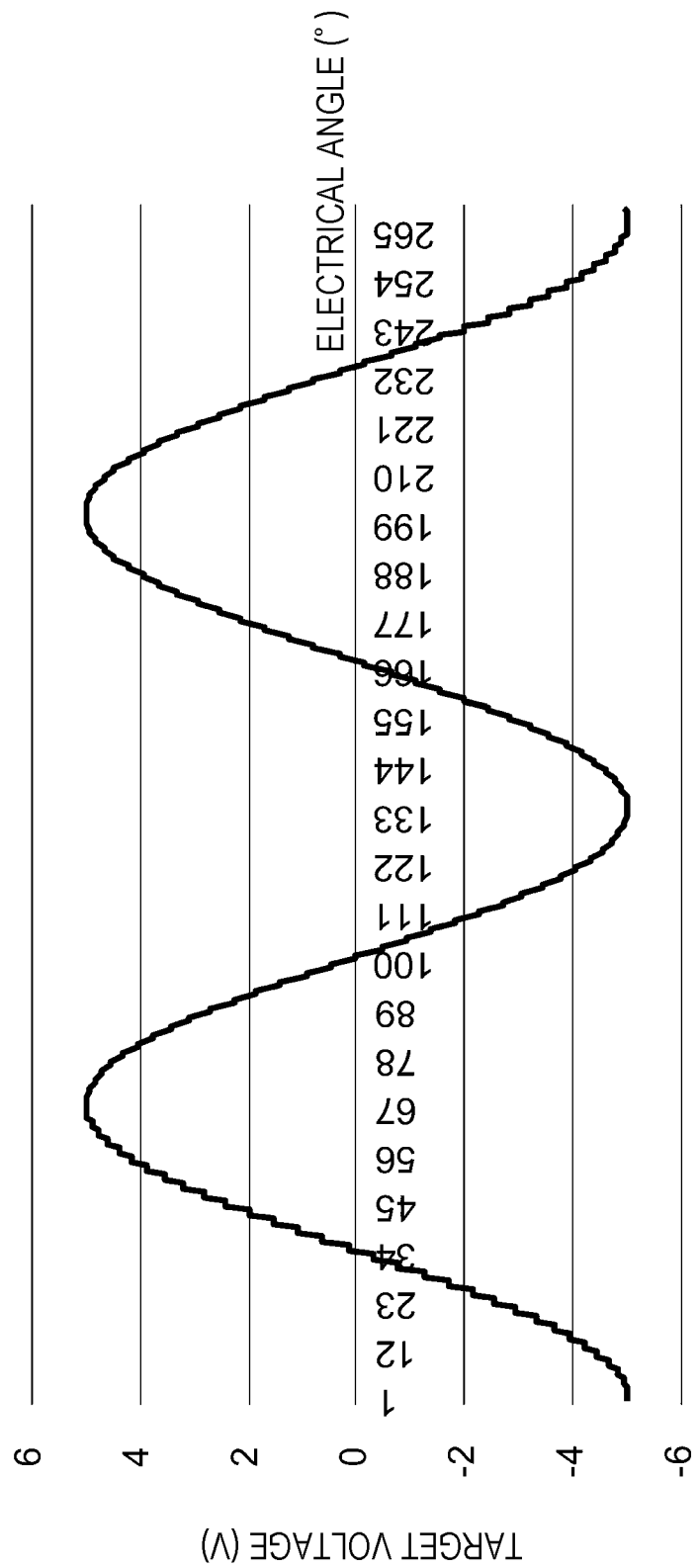
Figure 12B:
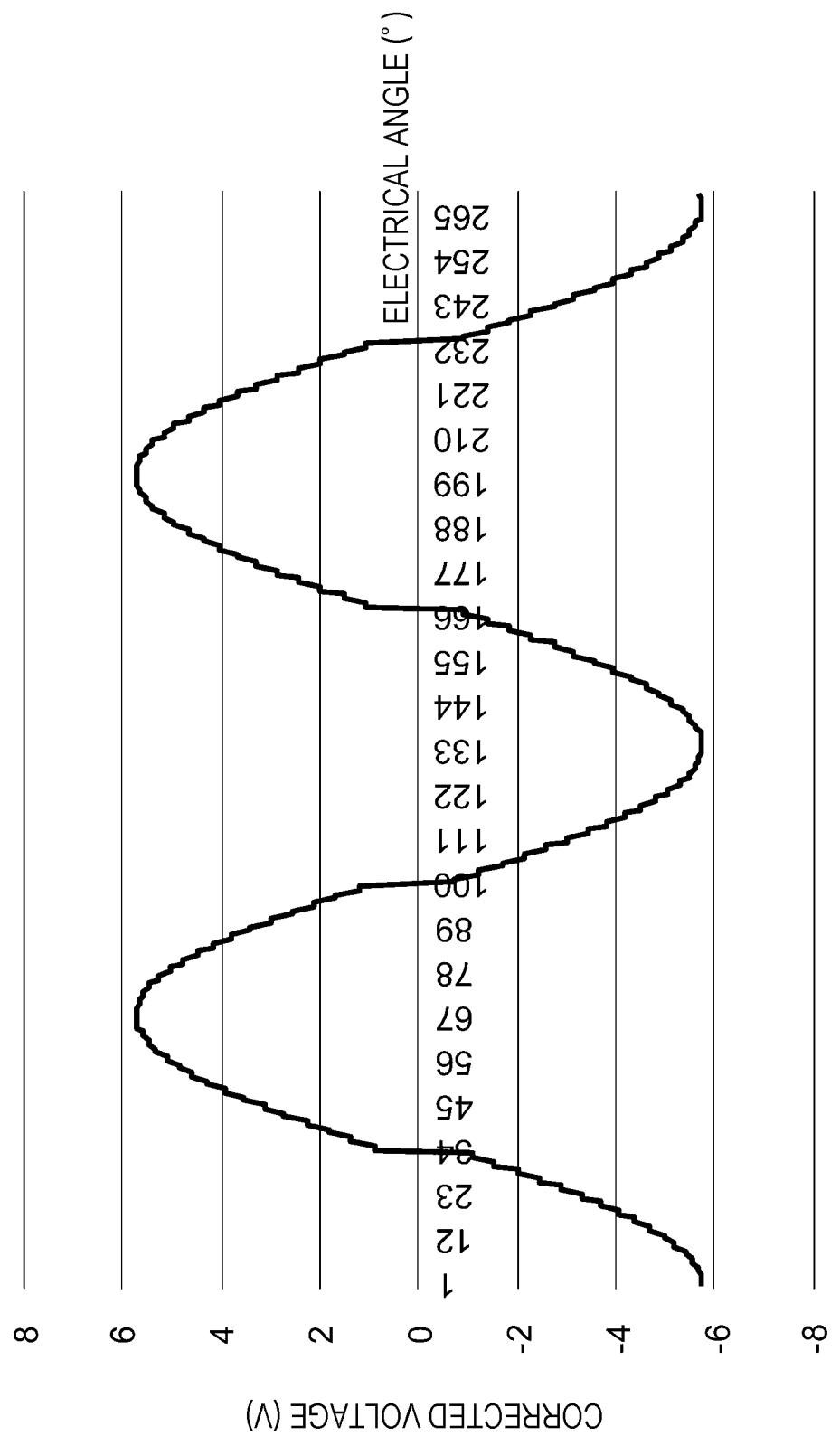

FIGS. 12A and 12B illustrate a waveform of a target voltage supplied by the coordinate converter 316 and a waveform of a corrected voltage corrected by the dead time corrector 318. FIG. 12A illustrates the waveform of the target voltage (Vu, Vv, or Vw) supplied by the coordinate converter 316. FIG. 12B illustrates the waveform of the corrected voltage (Vu', Vv', or Vw') corrected by the dead time corrector 318. In FIGS. 12A and 12B, the vertical axis represents a voltage (V) and the horizontal axis represents an electrical angle)(°. FIGS. 12A and 12B illustrate one of the three phases.

The waveform of the corrected voltage (Vu', Vv', or Vw') corrected by the dead time corrector 318 in FIG. 12B is obtained such that the waveform of the target voltage (Vu, Vv, or Vw) in FIG. 12A is split at the voltage of 0 V as a boundary and segments are shifted to the positive side and the negative side. Therefore, the absolute values of voltages near the zero crosses are particularly high.

FIGS. 13A to 13C illustrate an example of relationships among the corrected voltages (Vu', Vv', and Vw') set in the respective phases of the motor 10, the currents flowing in the respective phases of the motor 10, and the rotation amount of the rotation shaft 14 of the motor 10. FIG. 13A illustrates the corrected voltages (Vu', Vv', and Vw') set in the respective phases of the motor 10 (U, V, and W phases). FIG. 13B illustrates the currents flowing in the respective phases of the motor 10 (U, V, and W phases). FIG. 13C illustrates the rotation amount of the rotation shaft 14 of the motor 10. Each horizontal axis represents time. In FIG. 13C, the chain line represents an ideal case where the rotation amount of the rotation shaft 14 of the motor 10 changes in proportion to time.

In FIG. 13A, the corrected voltage set in each phase of the motor 10 (U, V, or W phase) is shifted to the positive side and the negative side near the zero cross as illustrated in FIG. 12B compared with the original voltage. That is, the voltage waveform near the zero cross is different from the voltage waveform in FIG. 6A that is not subjected to dead time correction. Thus, the current flowing in each phase of the motor 10 (U, V, or W phase) based on the corrected voltage is approximate to a sine wave in FIG. 13B. In FIG. 13B, the deviations from sine waves are suppressed at the portion α where the voltage Vw intersects 0 V in FIG. 6A, the portion β where the voltage Vu intersects 0 V, and the portion γ where the voltage Vv intersects 0 V.

Therefore, the deviation from the ideal rotation amount of the rotation shaft 14 represented by the chain line is suppressed as illustrated in FIG. 13C.

FIG. 14 is a timing chart of rotational control for the motor 10 to be performed by the motor control apparatus 30A according to the fourth exemplary embodiment. The horizontal axis represents time, which elapses in order of a time "a", a time "b", a time "c", . . . . The initial positional adjustment for the rotor 11 by the field fixing control in the first exemplary embodiment is finished and the different control apparatus gives a command to start the rotation of the motor 10 (turn ON the motor) at the time "a". FIG. 14 illustrates, from the top, a command speed for the rotation speed of the rotor 11 from the different control apparatus, a motor ON signal serving as a command to start the rotation of the motor 10, a positional deviation of the rotor 11, a motor stop signal serving as a command to stop the motor 10, a target q-axis current, a target d-axis current, and the electrical angle φe of the motor 10.

The rotation of the motor 10 is controlled in response to the motor ON signal serving as a command from the different control apparatus. The motor 10 is stopped when the command speed serving as a command from the different control apparatus is set to "0". At this time, the speed controller 306 supplies the motor stop signal to the coordinate converter 316. That is, the motor 10 is stopped by field control in which the command speed is set to "0", the q-axis current is set to 0 A, and the d-axis current is set to "X" A. The command speed of "0" is an example of a stop command signal. The setting of the command speed of "0" by the different control apparatus is an example of reception of a stop command speed.

In response to the motor ON signal commanding the rotation of the motor 10 at the time "a", the command speed gradually increases from "0". Immediately after the time "a", the positional deviation of the rotor 11 is "insufficient rotation" indicating that the rotor 11 rotates at a speed lower than the command speed. Along with the rotation of the rotor 11, the positional deviation decreases. A large target q-axis current is set to increase the rotation speed so that the rotation speed is controlled to reach the command speed with ease. Around the time "b" when the command speed is set to a constant value, the positional deviation is "excessive rotation" indicating that the rotor 11 rotates at a speed higher than the command speed. The target d-axis current is set to 0 A.

When the command speed is set to the constant value at the time "b", the target q-axis current is reduced so that the excessive rotation speed is controlled to reach the command speed with ease.

At the time "c", the positional deviation is "0" and the rotor 11 rotates at the command speed. The target q-axis current is kept at a constant value to keep the rotation of the rotor 11 at the command speed.

At a time "d", the command speed gradually decreases toward a stopped state starting from a time "e". The positional deviation of the rotor 11 is temporarily "excessive rotation" and is then "insufficient rotation" again. At this time, the target q-axis current is temporarily set to the negative side and then set to the positive side again to suppress the excessive rotation.

When the command speed is "0" at the time "e", the target q-axis current is set to 0 A and the target d-axis current is set to a predetermined value. That is, the field fixing control is performed. Regarding the positional deviation of the rotor 11, the rotor 11 in the "insufficient rotation" state is stopped at and fixed to a position corresponding to a preset electrical angle φe.

When the command speed is set to gradually increase again at a time "f", the rotor 11 starts to rotate similarly to the time "a". The period from the time "f" to a time "k" is similar to the period from the time "a" to the time "f" and therefore description thereof is omitted.

As described above, the rotation of the rotor 11 is controlled based on the command speed. As in the period from the time "a" to the time "b", the target q-axis current is controlled depending on the positional deviation of the rotor 11 so that the rotation speed of the rotor 11 promptly converges on the command speed. Although a longer period is required before the rotation speed of the rotor 11 converges on the command speed, the target q-axis current may be set to a constant value.

Fifth Exemplary Embodiment

In the fourth exemplary embodiment, the dead time corrector 318 constantly corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317. In a fifth exemplary embodiment, only when the motor stop signal is supplied, the dead time corrector 318 corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317.

Figure 15:
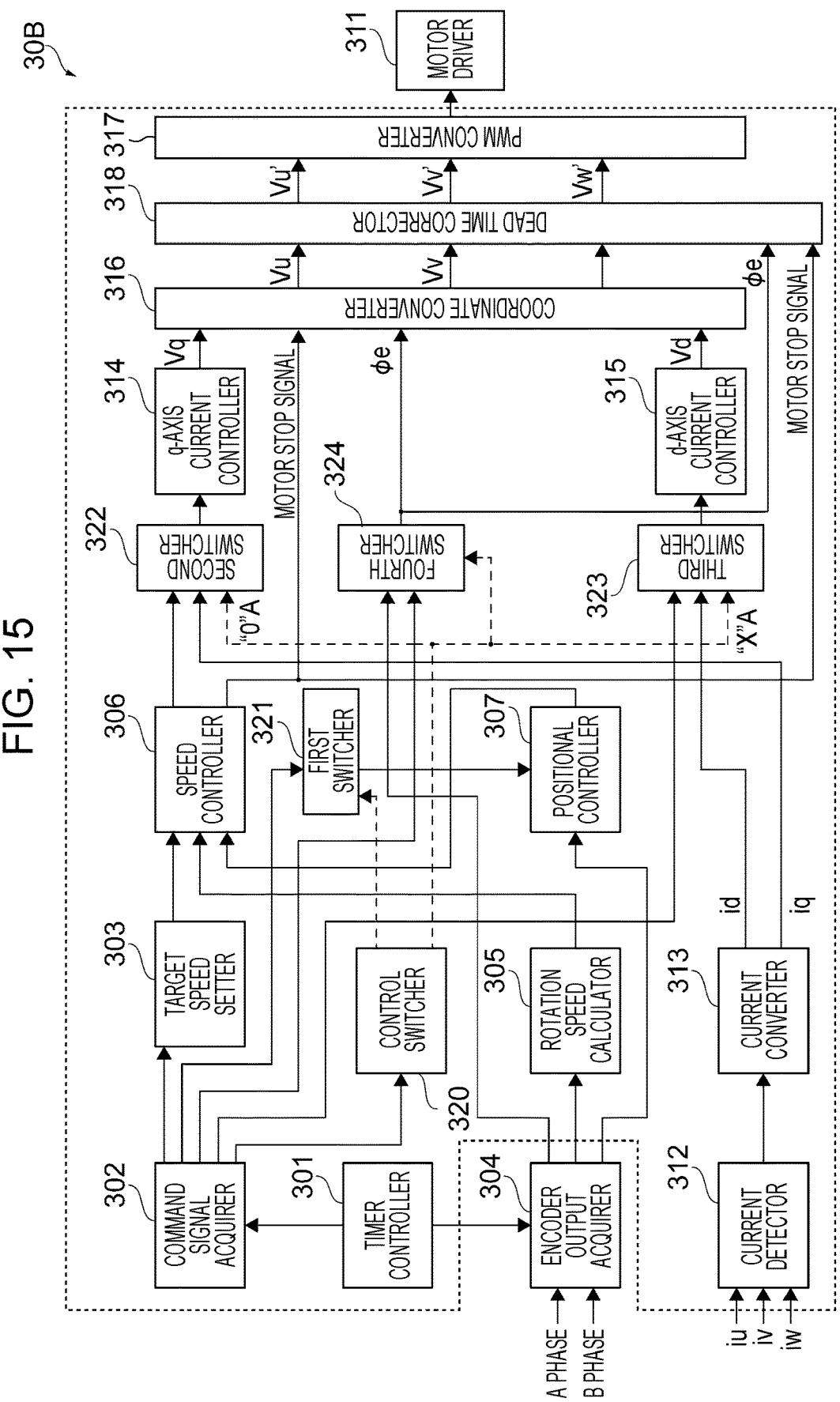
FIG. 15 illustrates an example of the functional configuration of a motor control apparatus according to a fifth exemplary embodiment.

FIG. 15 illustrates an example of the functional configuration of a motor control apparatus 30B according to the fifth exemplary embodiment. The dead time corrector 318 of the motor control apparatus 30B is supplied with the motor stop signal from the speed controller 306 in the configuration of the motor control apparatus 30A according to the fourth exemplary embodiment illustrated in FIG. 11. The other configuration is similar to that in the fourth exemplary embodiment and therefore description thereof is omitted.

In the rotation control, the dead time corrector 318 does not correct the voltages but supplies the target voltages (Vu, Vv, and Vw) from the coordinate converter 316 to the PWM converter 317. In response to the motor stop signal supplied from the speed controller 306, the dead time corrector 318 corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317. If the dead time correction is performed irrespective of whether the motor stop signal is supplied, the corrected voltages (Vu', Vv', and Vw') are generated to follow temporal changes in the target voltages (Vu, Vv, and Vw). While the motor 10 is stopped in response to the motor stop signal, the target voltages (Vu, Vv, and Vw) are fixed and therefore simply corrected into the corrected voltages (Vu', Vv', and Vw').

Sixth Exemplary Embodiment

In the fifth exemplary embodiment, only when the motor stop signal is supplied, the dead time corrector 318 corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317. In a sixth exemplary embodiment, only when the rotation speed of the motor 10 is equal to or lower than a predetermined speed, the dead time corrector 318 corrects the voltages (Vu, Vv, and Vw) supplied from the coordinate converter 316 into the voltages (Vu', Vv', and Vw') and supplies the voltages (Vu', Vv', and Vw') to the PWM converter 317.

Figure 16:
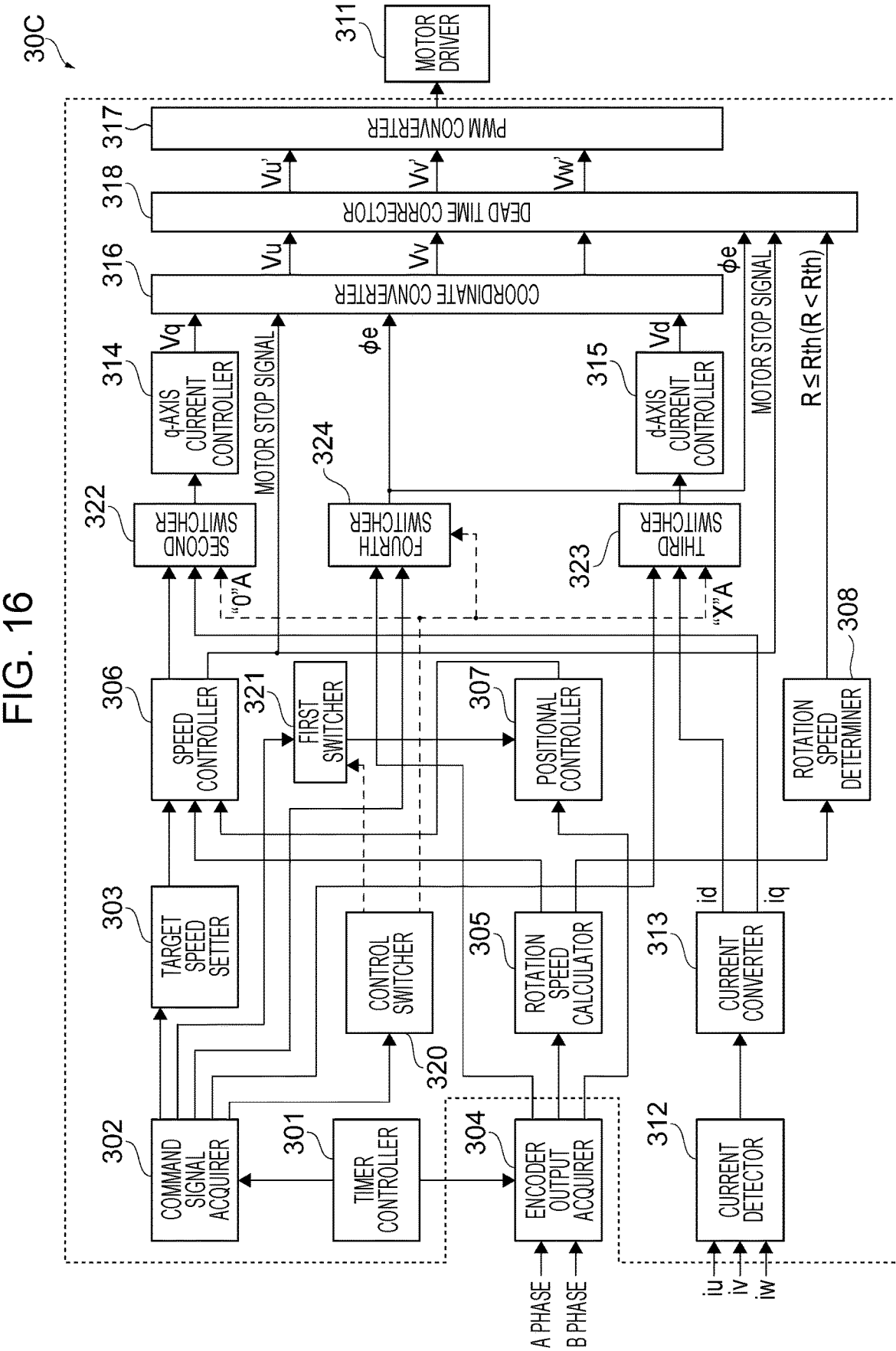
FIG. 16 illustrates an example of the functional configuration of a motor control apparatus according to a sixth exemplary embodiment.

FIG. 16 illustrates an example of the functional configuration of a motor control apparatus 30C according to the sixth exemplary embodiment. The motor control apparatus 30C includes a rotation speed determiner 308 in the configuration of the motor control apparatus 30B according to the fifth exemplary embodiment illustrated in FIG. 15. The rotation speed determiner 308 supplies a rotation speed signal to the dead time corrector 318. The rotation speed signal indicates that the rotation speed of the rotor 11 (represented by R) supplied from the rotation speed calculator 305 is equal to or lower than a predetermined rotation speed (represented by Rth) (R≤Rth). Only when the rotation speed signal is supplied, the dead time corrector 318 corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317. The rotation speed signal may be supplied when the rotation speed of the rotor 11 (R) is lower than the predetermined rotation speed (Rth) (R<Rth).

If the rotation speed of the rotor 11 (R) is higher than the predetermined rotation speed (Rth), the dead time corrector 318 does not correct the voltages but supplies the target voltages (Vu, Vv, and Vw) from the coordinate converter 316 to the PWM converter 317. If the rotation speed of the rotor 11 (R) is equal to or lower than the predetermined rotation speed (Rth) or if the rotation speed of the rotor 11 (R) is lower than the predetermined rotation speed (Rth), the dead time corrector 318 corrects the target voltages (Vu, Vv, and Vw) supplied from the coordinate converter 316 into the corrected voltages (Vu', Vv', and Vw') and supplies the corrected voltages (Vu', Vv', and Vw') to the PWM converter 317. The temporal changes in the target voltages (Vu, Vv, and Vw) are gentler at a low rotation speed than at a high rotation speed. With the gentle temporal changes in the target voltages (Vu, Vv, and Vw), the target voltages (Vu, Vv, and Vw) are simply corrected into the corrected voltages (Vu', Vv', and Vw').

Seventh Exemplary Embodiment

In the fourth exemplary embodiment, the rotor 11 is fixed to the position corresponding to the preset electrical angle φe in the stopped state. However, the actual stop position may be different from the position corresponding to the preset electrical angle φe due to influence of the load 2 or the like. In a seventh exemplary embodiment, the electrical angle is corrected when the actual stop position of the rotor 11 is different from the position corresponding to the electrical angle φe.

Figure 17:
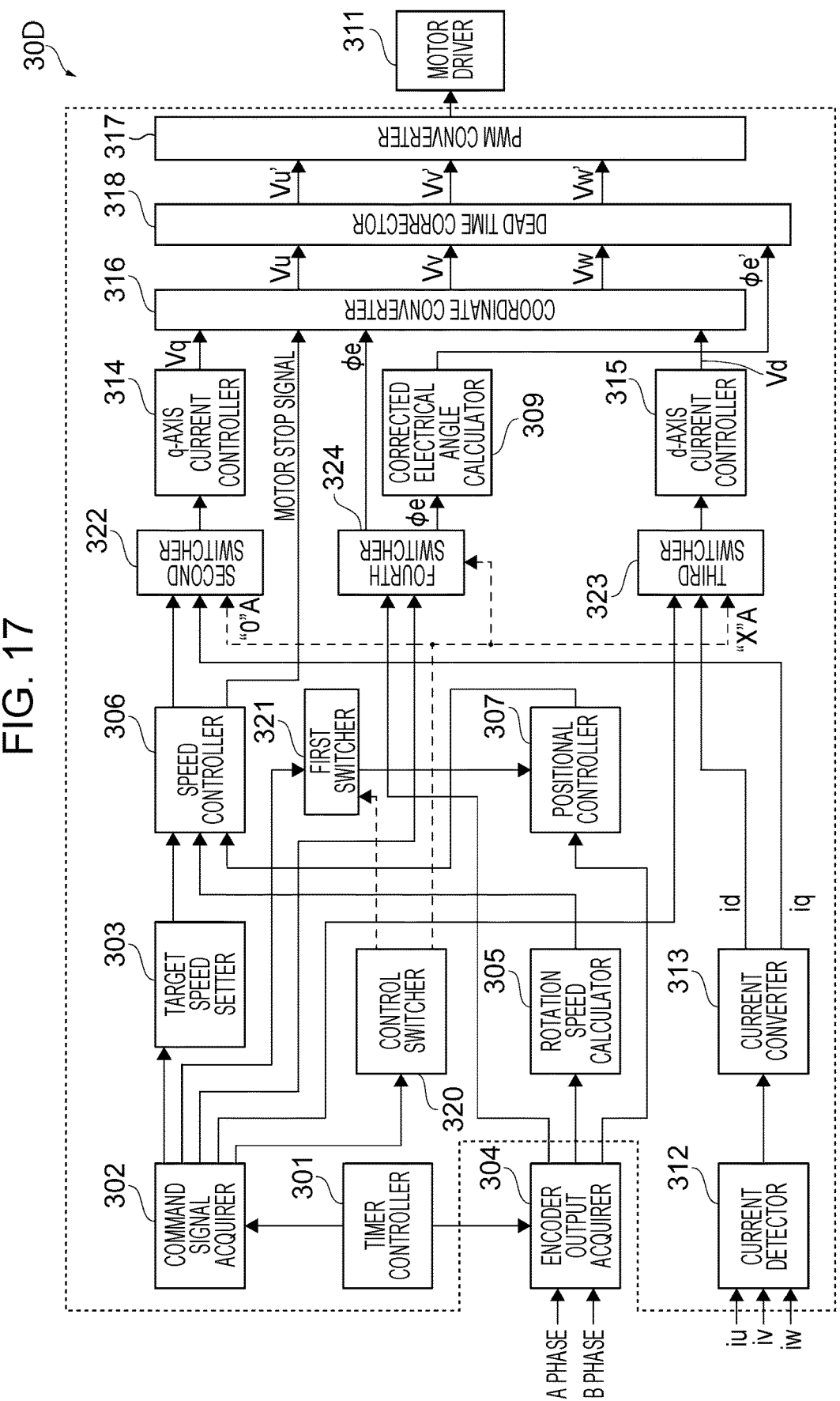
FIG. 17 illustrates an example of the functional configuration of a motor control apparatus according to a seventh exemplary embodiment.

FIG. 17 illustrates an example of the functional configuration of a motor control apparatus 30D according to the seventh exemplary embodiment. The motor control apparatus 30D includes a corrected electrical angle calculator 309 in the configuration of the motor control apparatus 30A according to the fourth exemplary embodiment illustrated in FIG. 11. If a deviation (represented by Δφe) occurs in the actual stop position of the rotor 11 acquired from the encoder output acquirer 304, the corrected electrical angle calculator 309 supplies a corrected electrical angle φe' to the dead time corrector 318. The corrected electrical angle φe' is obtained by correcting (−Δφe) the deviation (Δφe) in the electrical angle. The dead time corrector 318 replaces the electrical angle with the corrected electrical angle φe'.

Figure 18:
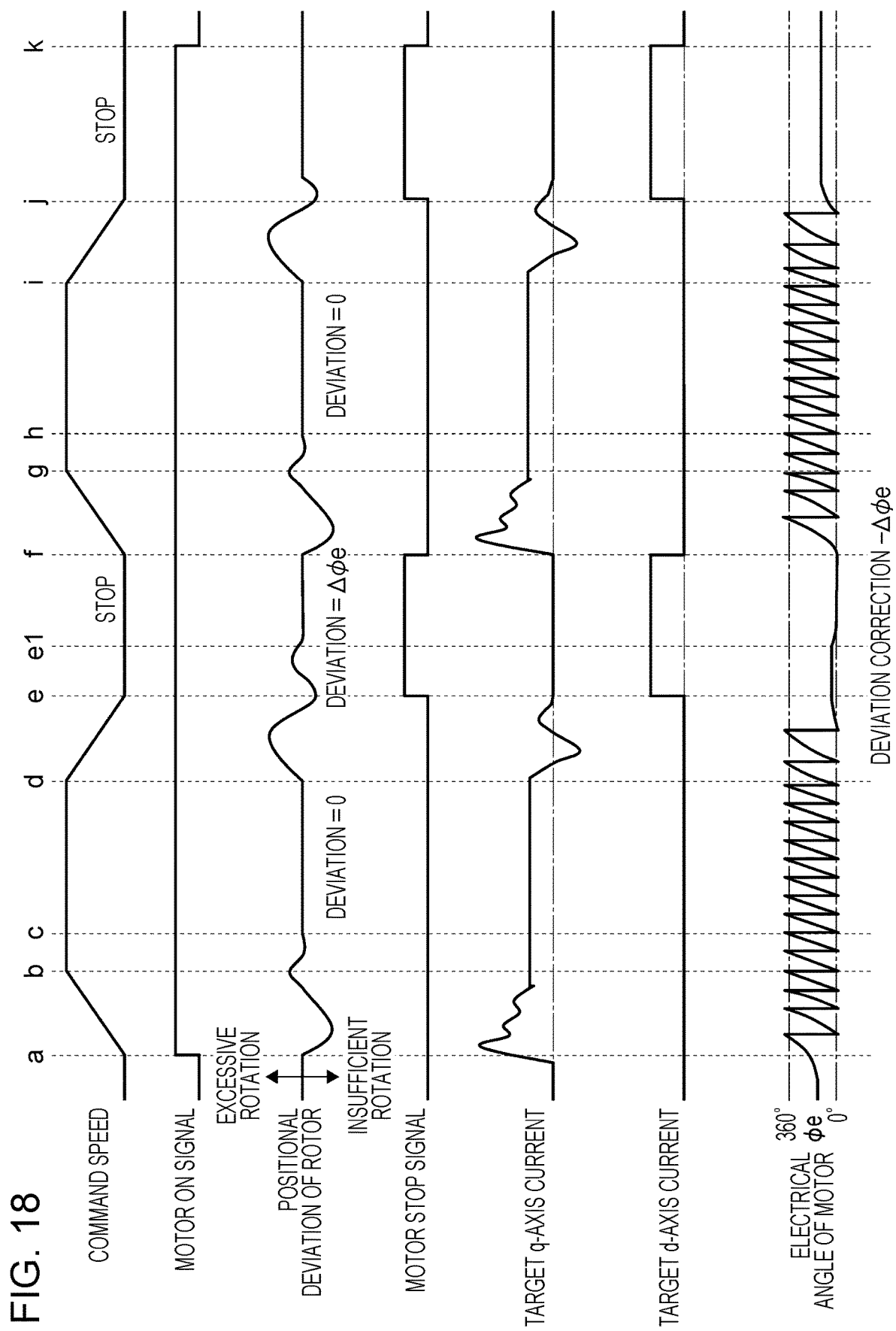
FIG. 18 is a timing chart of rotational control for the motor to be performed by the motor control apparatus according to the seventh exemplary embodiment.

FIG. 18 is a timing chart of rotational control for the motor 10 to be performed by the motor control apparatus 30D according to the seventh exemplary embodiment. The horizontal axis represents time. The timing chart of FIG. 18 is the same as the timing chart of FIG. 14 except for the period between the time "e" and the time "f". Therefore, the period between the time "e" and the time "f" is described and description of the other periods is omitted. In FIG. 18, a time "e1" is provided between the time "e" and the time "f".

When the command speed is "0" at the time "e", the rotor 11 is stopped. For example, the actual stop position of the rotor 11 deviates from the specified position by Δφe in terms of the electrical angle. That is, the deviation Δφe occurs in the actual stop position in terms of the electrical angle. The corrected electrical angle calculator 309 calculates the electrical angle φe' by correcting the electrical angle φe by −Δφe and supplies the electrical angle φe' to the dead time corrector 318. Thus, the electrical angle φe is corrected into the electrical angle φe' and influence on subsequent rotation control for the rotor 11 is suppressed. If the rotation control is started from the time "f" while the deviation occurs in the actual stop position, the control is performed with the deviation remaining in the position of the rotor 11.

Eighth Exemplary Embodiment

In the fifth to seventh exemplary embodiments, the d-axis current continues to flow while the rotor 11 is stopped. However, the d-axis current need not continue to flow if the rotor 11 remains stopped. In an eighth exemplary embodiment, the d-axis current is reduced after the rotor 11 is stopped.

Figure 19:
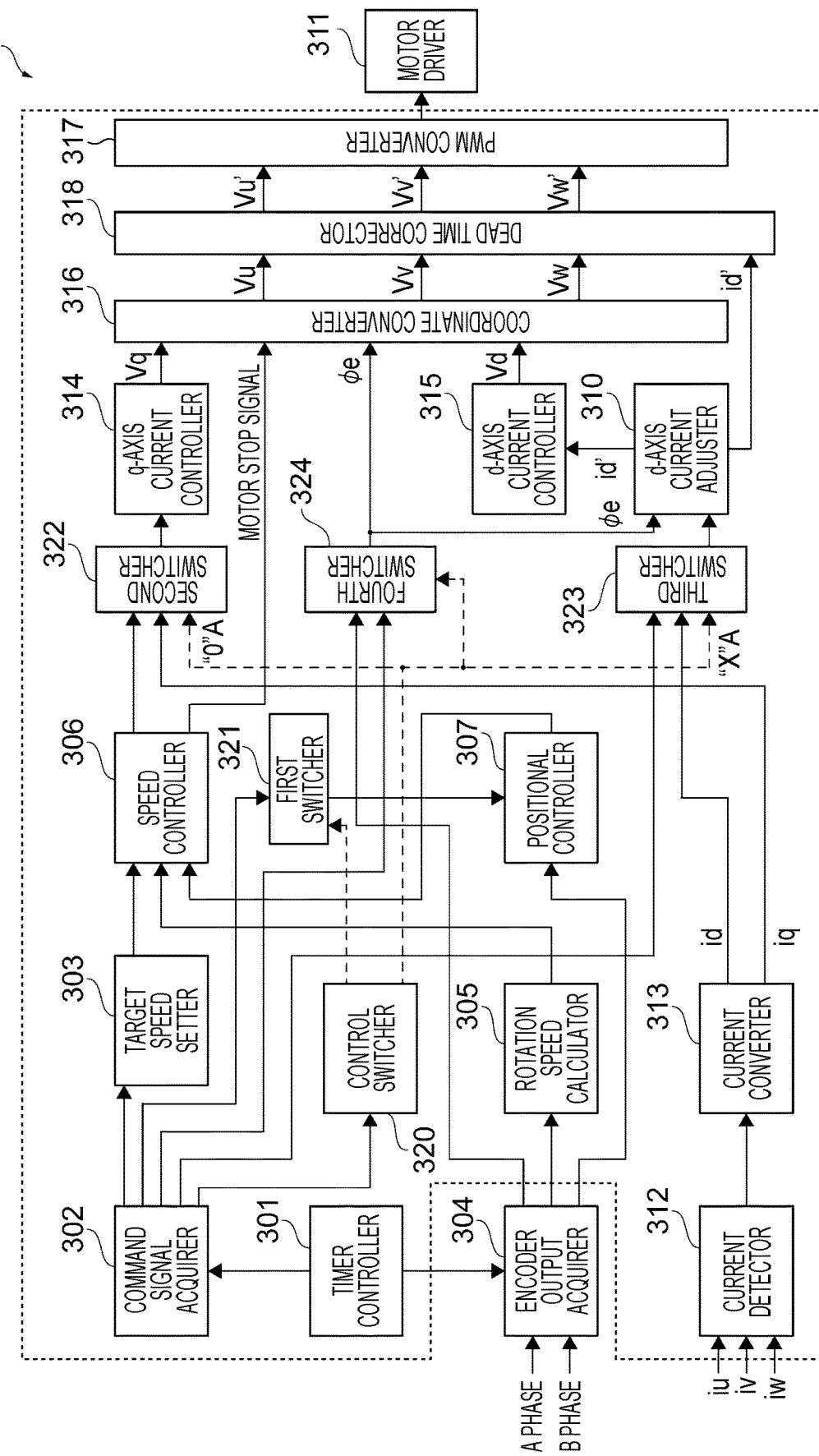
FIG. 19 illustrates an example of the functional configuration of a motor control apparatus according to an eighth exemplary embodiment.

FIG. 19 illustrates an example of the functional configuration of a motor control apparatus 30E according to the eighth exemplary embodiment. The motor control apparatus 30E includes a d-axis current adjuster 310 in the configuration of the motor control apparatus 30A according to the fourth exemplary embodiment illustrated in FIG. 11. The d-axis current adjuster 310 is supplied with the d-axis current via the third switcher 323 and the electrical angle φe via the fourth switcher 324. If the position of the stopped rotor 11 is a specified position in terms of the electrical angle φe, the d-axis current adjuster 310 supplies a reduced d-axis current to the dead time corrector 318. The case where the position of the rotor 11 is the specified position in terms of the electrical angle φe encompasses a case where the position of the rotor 11 falls within a predetermined range including boundaries or a predetermined range excluding boundaries.

FIG. 20 is a timing chart of rotational control for the motor 10 to be performed by the motor control apparatus 30E according to the eighth exemplary embodiment. The horizontal axis represents time. The timing chart of FIG. 20 is the same as the timing chart of FIG. 14 except for the period between the time "e" and the time "f" and the period between the time "j" and the time "k". Therefore, the period between the time "e" and the time "f" and the period between the time "j" and the time "k" are described and description of the other periods is omitted. In FIG. 20, a time "e1", a time "e2", a time "e3", and a time "e4" are provided between the time "e" and the time "f" and a time "j1" and a time "j2" are provided between the time "j" and the time "k".

When the command speed is "0" at the time "e", the rotor 11 is stopped. At the time "e1", the rotor 11 has a positional deviation and therefore the d-axis current adjuster 310 keeps the d-axis current that has brought the rotor 11 into the stopped state. When the positional deviation falls within a predetermined range including boundaries or a predetermined range excluding boundaries at the time "e2", the d-axis current adjuster 310 gradually reduces the d-axis current. When the positional deviation falls out of the predetermined range including boundaries or the predetermined range excluding boundaries at the time "e3", the d-axis current adjuster 310 gradually increases the d-axis current. Thus, the positional deviation decreases. At the time "e4", the d-axis current adjuster 310 keeps the d-axis current.

When the command speed is "0" at the time "j", the rotor 11 is stopped. When the positional deviation of the rotor 11 falls within the predetermined range including boundaries or the predetermined range excluding boundaries at the time "j1", the d-axis current adjuster 310 gradually reduces the d-axis current. In this case, no positional deviation occurs at the time "j2" and therefore the d-axis current adjuster 310 sets the d-axis current to 0 A.

As described above, when the rotor 11 is stopped, the d-axis current adjuster 310 changes the d-axis current depending on the positional deviation of the rotor 11 (deviation of the electrical angle φe). For example, the d-axis current adjuster 310 may set the d-axis current to 0 A when the positional deviation of the rotor 11 falls within the predetermined range including boundaries or the predetermined range excluding boundaries. When the positional deviation of the stopped rotor 11 falls out of the predetermined range including boundaries or the predetermined range excluding boundaries, the d-axis current adjuster 310 may increase the d-axis current to reduce the positional deviation of the rotor 11. When the positional deviation of the rotor 11 falls within the predetermined range including boundaries or the predetermined range excluding boundaries, the d-axis current adjuster 310 may reduce the d-axis current below the d-axis current that has brought the rotor 11 into the stopped state. The predetermined range of the positional deviation need not be "0" but may be any permissible deviation range.

Some of the fifth to eighth exemplary embodiments may be combined.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control apparatus, comprising a controller that controls, by vector control, voltages and currents to be supplied to a plurality of phases of a brushless motor, the vector control being performed through (1) rotation control using a q-axis current predominantly to control rotation of a rotor, and (2) field fixing control using a d-axis current predominantly in response to reception of a stop command signal,
wherein the controller controls the brushless motor with reduced influence of a dead time, in which a high-side switching element and a low-side switching element of each of a plurality of half-bridge circuits are simultaneously set to OFF, the plurality of half-bridge circuits being provided in association with the plurality of phases of the brushless motor and being configured to supply the voltages and the currents to the respective phases, the influence of the dead time being reduced through the field fixing control.

2. The control apparatus according to claim 1, further comprising an acquirer that acquires rotation information indicating a rotation amount and a rotation direction of the rotor of the brushless motor,
wherein the controller performs, in the field fixing control, initial positional adjustment between a position of the rotor of the brushless motor and an electrical angle in the vector control, and
wherein the controller is configured to, when the initial positional adjustment is performed:
set an electrical angle while avoiding electrical angles at which a voltage near a zero cross is applied in any one of the plurality of phases of the brushless motor; and
determine an electrical angle corresponding to the position of the rotor based on the rotation information acquired by the acquirer.

3. The control apparatus according to claim 2, wherein, after the initial positional adjustment is finished, the controller returns the position of the rotor to a position prior to the initial positional adjustment.

4. The control apparatus according to claim 1, further comprising an acquirer that acquires rotation information indicating a rotation amount and a rotation direction of the rotor of the brushless motor,
wherein the controller performs, in the field fixing control, initial positional adjustment between a position of the rotor of the brushless motor and an electrical angle in the vector control, and
wherein the controller is configured to, when the initial positional adjustment is performed:
set an electrical angle at which a voltage having a maximum absolute value is applied in any one of the plurality of phases of the brushless motor; and
determine an electrical angle corresponding to the position of the rotor based on the rotation information acquired by the acquirer.

5. The control apparatus according to claim 4, wherein, if the rotor rotates based on the set electrical angle and the rotation amount indicated by the rotation information acquired from the acquirer is equal to or larger than a predetermined amount, the controller sets a new electrical angle at which a voltage having a maximum absolute value is applied in any one of the plurality of phases, the new electrical angle corresponding to a position closest to the position of the rotor in a direction opposite to the rotation direction of the rotor.

6. The control apparatus according to claim 5, wherein, after the initial positional adjustment is finished, the controller returns the position of the rotor to a position prior to the initial positional adjustment.

7. The control apparatus according to claim 4, wherein, after the initial positional adjustment is finished, the controller returns the position of the rotor to a position prior to the initial positional adjustment.

8. The control apparatus according to claim 1, wherein the controller sets the voltages to be applied in the plurality of phases of the brushless motor in the field fixing control to voltages obtained by correcting the voltages to be applied in the rotation control.

9. The control apparatus according to claim 8, further comprising an acquirer that acquires rotation information indicating a rotation amount and a rotation direction of the rotor of the brushless motor,
wherein, if the rotor is stopped and a deviation occurs between the position of the rotor obtained based on the rotation information and a position corresponding to a command electrical angle, the controller corrects the electrical angle depending on the deviation.

10. The control apparatus according to claim 9, wherein the controller is configured to, in response to a stop of the rotor in the field fixing control:
reduce the d-axis current if the deviation between the position of the rotor obtained based on the rotation information and the position corresponding to the command electrical angle falls within a predetermined range including boundaries or a predetermined range excluding boundaries; and
increase the d-axis current if the deviation between the position of the rotor and the position corresponding to the command electrical angle falls out of the predetermined range including boundaries or the predetermined range excluding boundaries.

11. The control apparatus according to claim 8, further comprising an acquirer that acquires rotation information indicating a rotation amount and a rotation direction of the rotor of the brushless motor,
wherein the controller is configured to, in response to a stop of the rotor in the field fixing control:
reduce the d-axis current if a deviation between the position of the rotor obtained based on the rotation information and a position corresponding to a command electrical angle falls within a predetermined range including boundaries or a predetermined range excluding boundaries; and
increase the d-axis current if the deviation between the position of the rotor and the position corresponding to the command electrical angle falls out of the predetermined range including boundaries or the predetermined range excluding boundaries.

12. A brushless motor, comprising:
the control apparatus according to claim 1;
a rotor; and
a plurality of coils arranged around the rotor in association with the plurality of phases to which the voltages and the currents controlled by the control apparatus are supplied.

13. A control apparatus, comprising a controller that controls, by vector control, voltages and currents to be supplied to a plurality of phases of a brushless motor, the vector control being performed through (1) rotation control using a q-axis current predominantly to control rotation of a rotor, and (2) field fixing control using a d-axis current predominantly in response to reception of a stop command signal,
wherein the controller controls the brushless motor with reduced influence of a dead time, in which a high-side switching element and a low-side switching element of each of a plurality of half-bridge circuits configured to supply the voltages and the currents to the respective phases are simultaneously set to OFF, the influence of the dead time being reduced by target voltages obtained by correcting the voltages to be applied in the plurality of phases of the brushless motor.

14. A control apparatus, comprising:
an acquirer that acquires rotation information indicating a rotation amount and a rotation direction of a rotor of a brushless motor; and
a controller that controls, by vector control, voltages and currents to be supplied to a plurality of phases of the brushless motor, the vector control being performed through (1) rotation control using a q-axis current predominantly to control rotation of the rotor, and (2) field fixing control using a d-axis current predominantly in response to reception of a stop command signal,
wherein, if a rotation speed of the rotor obtained based on the rotation information acquired by the acquirer is equal to or lower than a predetermined rotation speed or if the rotation speed of the rotor is lower than the predetermined rotation speed, the controller controls the brushless motor by setting target voltages obtained by correcting the voltages to be applied in the plurality of phases of the brushless motor.

* * * * *